(12) United States Patent
Jang et al.

(10) Patent No.: US 11,447,327 B2
(45) Date of Patent: Sep. 20, 2022

(54) INJECTION CONTAINER CAPABLE OF RELIEVING OVERPRESSURE AND VALVE ASSEMBLY THEREOF

(71) Applicants: SEUNG IL CORPORATION, Cheonan-si (KR); TAEYANG CO., LTD., Cheonan-si (KR)

(72) Inventors: Hajin Jang, Incheon (KR); Changhee Koh, Incheon (KR); Kihong Lee, Incheon (KR)

(73) Assignees: SEUNG IL CORPORATION, Cheonan-si (KR); TAEYANG CO., LTD., Cheonan-si (KR)

( * ) Notice: Subject to any disclaimer, the term of this patent is extended or adjusted under 35 U.S.C. 154(b) by 0 days.

(21) Appl. No.: 17/292,877

(22) PCT Filed: Aug. 5, 2019

(86) PCT No.: PCT/KR2019/009714
§ 371 (c)(1),
(2) Date: May 11, 2021

(87) PCT Pub. No.: WO2020/149479
PCT Pub. Date: Jul. 23, 2020

(65) Prior Publication Data
US 2021/0403227 A1    Dec. 30, 2021

(30) Foreign Application Priority Data

Jan. 15, 2019    (KR) .................. 10-2019-0005346

(51) Int. Cl.
| | | |
|---|---|---|
| B65D 83/50 | (2006.01) | |
| B65D 83/70 | (2006.01) | |
| F16K 17/38 | (2006.01) | |

(52) U.S. Cl.
CPC ............. *B65D 83/50* (2013.01); *B65D 83/70* (2013.01); *F16K 17/383* (2013.01)

(58) Field of Classification Search
CPC ........ B65D 83/50; B65D 83/70; B65D 83/48; B65D 83/44; F16K 17/383
See application file for complete search history.

(56) References Cited

U.S. PATENT DOCUMENTS

| | | |
|---|---|---|
| 1,486,326 A | 4/1924 | McMasters |
| 1,489,326 A | 4/1924 | McMasters |
| (Continued) | | |

FOREIGN PATENT DOCUMENTS

| | | |
|---|---|---|
| JP | 02-058184 U | 4/1990 |
| JP | 2001-514132 A | 9/2001 |
| (Continued) | | |

OTHER PUBLICATIONS

International Preliminary Report on Patentability dated Jul. 29, 2021 with a Translation of the Written Opinion of the International Searching Authority in Application No. PCT/KR2019/009714.

(Continued)

*Primary Examiner* — Vishal Pancholi
(74) *Attorney, Agent, or Firm* — Sughrue Mion, PLLC

(57) ABSTRACT

Provided is an injection container capable of relieving an overpressure state which includes a housing having therein an accommodation space for accommodating contents, and having an upper sealing cap for sealing an upper part of the accommodation space; a mounting cup mounted to the upper sealing cap, and having a through hole at a middle part thereof; a stem housing including a mounting portion having a hollow portion therein and mounted to the mounting cup, and a communication flow path for communicating the hollow portion with the accommodating space; a valve stem having one side which passes through the through hole, (Continued)

having another side arranged at the hollow portion so as to be slidable, and having an orifice selectively communicated with the hollow portion by the sliding; and a flow path blocking valve configured to block the communication flow path when an overpressure occurs.

12 Claims, 16 Drawing Sheets

(56) References Cited

U.S. PATENT DOCUMENTS

| | | | | |
|---|---|---|---|---|
| 3,357,601 | A * | 12/1967 | Crawford | B65D 83/14 |
| | | | | 222/397 |
| 3,951,314 | A * | 4/1976 | Toro | B65D 83/34 |
| | | | | 222/402.18 |
| 4,479,506 | A | 10/1984 | Goans | |
| 4,854,343 | A * | 8/1989 | Rilett | F17C 1/14 |
| | | | | 251/126 |
| 7,793,686 | B2 * | 9/2010 | Lee | F17C 13/12 |
| | | | | 137/588 |
| 2005/0217725 | A1 * | 10/2005 | Moore | F16K 17/383 |
| | | | | 137/75 |
| 2019/0120394 | A1 * | 4/2019 | Won | F16K 17/30 |

FOREIGN PATENT DOCUMENTS

| | | |
|---|---|---|
| JP | 2002-213736 A | 7/2002 |
| KR | 10-1714501 B1 | 3/2017 |
| KR | 10-1895583 B1 | 8/2018 |
| WO | 2017/171143 A1 | 10/2017 |

OTHER PUBLICATIONS

International Search Report for PCT/KR2019/009714 dated Nov. 7, 2019 [PCT/ISA/210].
Korean Office Action for 10-2019-0005346 dated Jan. 3, 2020.
Office Action dated May 10, 2022 in Japanese Application No. 2021-531566.

* cited by examiner

INJECTION CONTAINER CAPABLE OF RELIEVING OVERPRESSURE AND VALVE ASSEMBLY THEREOF

CROSS-REFERENCE TO RELATED APPLICATION

This application is a National Stage of International Application No. PCT/KR2019/009714 filed Aug. 5, 2019, claiming priority based on Korean Patent Application No. 10-2019-0005346 filed Jan. 15, 2019, the entire disclosures of which are incorporated herein by reference.

BACKGROUND

1. Technical Field

The present invention relates to an injection container capable of relieving an overpressure state.

2. Description of the Related Art

Generally, an injection container refers to a vessel capable of outwardly injecting contents (fluid or gas) to be injected, by using an inner pressure, in a sealed state of the contents to be injected in a housing. Representative examples of the injection containers include portable gas containers, insecticidal sprays, hair sprays, portable aerosol extinguishers, gas lighter containers, and the like.

Typically, the injection container includes a housing (can) for filling the contents, a mounting cup fixed to an upper end of the housing, and a valve assembly fixed to a central protruding part of the mounting cup. The valve assembly is configured to maintain a closed state when the injection container is not in use and to discharge the contents only when used.

Meanwhile, the injection container may reach an overpressure state for thermal, mechanical, or chemical reasons during use or storage. However, a malfunction (such as expansion and transformation) of the injection container occurs when the injection container reaches the overpressure state because the valve assembly is configured to maintain the closed state or discharge the certain amount of the contents.

The problems, such as an explosion of the injection container or reaching into a dangerous situation, may occur due to the malfunction of the injection container. Thus, conventionally, have been used methods to add various structures for discharging the overpressure gas to the outside. However, these structures have a problem that another type of safety accident occurs because these structures instantaneously discharge the massive amount of over-pressurized gas.

Thus, the present invention is to propose a structure and a mechanism capable of preventing an overpressure state of an injection container and preventing a discharge of gas of the injection container to the outside, in order to prevent a malfunction of the injection container.

SUMMARY

Therefore, an aspect of the present invention is to provide an injection container and a valve assembly thereof, the injection container capable of relieving an overpressure before a malfunction due to the overpressure occurs, with an overpressure relieving mechanism differentiated from the conventional one.

Another aspect of the present invention is to provide an injection container and a valve assembly thereof, the injection container capable of preventing danger of safety accidents not by leaking gas therein to the outside.

In order to achieve these and other advantages and in accordance with the purpose of this specification, as embodied and broadly described herein, there is provided an injection container, comprising: a housing having therein an accommodation space for accommodating contents, and having an upper sealing cap for sealing an upper part of the accommodation space; a mounting cup mounted to the upper sealing cap, and having a through hole at a middle part thereof; a stem housing including a mounting portion having a hollow portion therein and mounted to the mounting cup, and a communication flow path for communicating the hollow portion with the accommodating space; a valve stem having one side which passes through the through hole, having another side arranged at the hollow portion so as to be slidable, and having an orifice selectively communicated with the hollow portion by the sliding; and a flow path blocking valve configured to block the communication flow path when an overpressure occurs, wherein the flow path blocking valve includes: a body inserted into an inlet of the communication flow path, and communicated with the accommodation space; a closing member accommodated in the body; and a melting portion configured to support the closing member in a solid state, and formed to melt at a temperature more than a preset level to be introduced into the communication flow path as the supported state by the closing member is released.

According to another embodiment of the present invention, there is provided an injection container, comprising: a housing having therein an accommodation space for accommodating contents, and having an upper sealing cap for sealing an upper part of the accommodation space; a mounting cup mounted to the upper sealing cap, and having a through hole at a middle part thereof; a stem housing including a mounting portion having a hollow portion therein and mounted to the mounting cup, and a communication flow path for communicating the hollow portion with the accommodating space; a valve stem having one side which passes through the through hole, having another side arranged at the hollow portion so as to be slidable, and having an orifice selectively communicated with the hollow portion by the sliding; and a flow path blocking valve configured to block an inlet of the communication flow path when an overpressure occurs, wherein the flow path blocking valve includes a melting portion arranged on a flow path connected to the inlet of the communication flow path in a solid state, and formed to melt at a temperature more than a preset level, and wherein a moving path of the melting portion which has melted is formed between the flow path blocking valve and the communication flow path, such that the melting portion melts, moves, and is solidified to block at least a part of the communication flow path when an inner temperature of the accommodation space is increased to a level more than a preset temperature.

The stem housing may be further provided with a mounting portion arranged on a part of the communication flow path, in order to hinder a flow of the melted melting portion introduced into the communication flow path, for solidification of the melting portion, the mounting portion formed to block a region of the communication flow path where the melted melting portion passes.

The mounting portion may be formed to have a net shape.

The communication flow path may be formed to have its width narrowed along a moving path of the melted melting portion, the communication flow path along which the contents pass while the melted melting portion is introduced into the communication flow path.

The flow path blocking valve may include: a body formed to be inserted into the inlet of the communication flow path, and formed to be communicated with the accommodation space; and a closing member formed to be accommodated in the body. The closing member may be formed such that at least a part thereof is fixed to the melting portion, so as to block the communication flow path by moving to the inlet of the communication flow path, in a case that an inner temperature of the accommodation space is increased to a level more than a preset temperature.

The melting portion may be disposed between the inlet of the communication flow path and the closing member, so as to prevent a movement of the closing member in a solid state before the melting.

An insertion part of the flow path blocking valve to the communication flow path may be arranged in a gravitational direction, in a mounted state of the injection container to an external device, such that the closing member and the melting portion move in the gravitational direction as the locked state is released.

The closing member and the inlet of the communication flow path may be formed to have their surfaces contacting each other, the surfaces facing each other after the closing member moves to the inlet of the communication flow path to block the communication flow path.

The closing member may be formed to have a spherical shape.

The closing member may be formed of a material having a higher melting point than the melting portion.

At least one of the closing member and the inlet of the communication flow path may be formed of a magnetic material such that an attractive force is applied between the closing member and the inlet of the communication flow path.

According to still another embodiment of the present invention, there is provided an injection container, comprising: a housing having therein an accommodation space for accommodating contents, and having an upper sealing cap for sealing an upper part of the accommodation space; a mounting cup mounted to the upper sealing cap, and having a through hole at a middle part thereof; a stem housing including a mounting portion having a hollow portion therein and mounted to the mounting cup, and a communication flow path for communicating the hollow portion with the accommodating space; a valve stem having one side which passes through the through hole, having another side arranged at the hollow portion so as to be slidable, and having an orifice selectively communicated with the hollow portion by the sliding; and a flow path blocking valve configured to block an inlet of the communication flow path when an overpressure occurs, wherein the flow path blocking valve includes a body formed to be inserted into the inlet of the communication flow path, and formed to be communicated with the accommodation space; a closing member formed to be accommodated in the body; and a melting portion arranged on a flow path connected to the inlet of the communication flow path in a solid state, and formed to melt at a temperature more than a preset level, and wherein the melting portion is provided with a locking portion formed to have a hook shape before the melting portion melts in a solid state, and formed to support one side of the closing member which is towards the communication flow path, such that the closing member moves to the inlet of the communication flow path to block the communication flow path, in a case that an inner temperature of the accommodation space is increased to a level more than a preset temperature.

To achieve the above purposes, the present invention provides a valve assembly mounted to a mounting cup fixed to an upper end of a housing, the valve assembly comprising: a stem housing including a mounting portion having a hollow portion therein and mounted to the mounting cup, and a communication flow path for communicating the hollow portion with the accommodating space; a valve stem having one side which passes through a central part of the mounting cup, having another side arranged at the hollow portion so as to be slidable, and having an orifice selectively communicated with the hollow portion by the sliding; and a flow path blocking valve configured to block an inlet of the communication flow path when an overpressure occurs, wherein the flow path blocking valve includes a melting portion arranged on a flow path connected to the inlet of the communication flow path in a solid state, and formed to melt at a temperature more than a preset level, and wherein a moving path of the melting portion which has melted is formed between the flow path blocking valve and the communication flow path, such that the melting portion melts, moves, and is solidified to block at least a part of the communication flow path when an inner temperature of the accommodation space is increased to a level more than a preset temperature.

In the injection container and the valve assembly thereof according to the present invention, in a case that an inner temperature of the housing is increased to a level more than a preset temperature due to an overpressure, the melting portion provided at the flow path blocking valve and melted at a temperature more than a preset level moves towards the communication flow path of the stem housing, and is solidified. Thus, the communication flow path is closed such that gas does not flow therealong. This may solve an overpressure state of the injection container, and may prevent a malfunction due to the overpressure state.

Further, the flow path blocking valve includes the body formed to be inserted into the inlet of the communication flow path, and the closing member formed to be accommodated in the body. And at least a part of the closing member is formed to be fixed to the melting portion. Under the configurations, when the inner temperature of the housing is increased to a level more than a preset temperature, the closing member is separated from the melting portion, thereby primarily blocking the inlet of the communication flow path. Additionally, the melted melting portion flows to a gap between the closing member and the communication flow path, thereby being solidified. This may enhance a blocking performance of the communication flow path, and may stably maintain a blocked state of the communication flow path by preventing a movement of the closing member.

DETAILED DESCRIPTION OF THE EMBODIMENTS

Hereinafter, an injection container and a valve assembly thereof according to the present invention will be explained in more detail with reference to the attached drawings. A singular representation may include a plural representation unless it represents a definitely different meaning from the context.

If it is determined that detailed explanations of the well-known technical arts may make the gist of embodiments disclosed in this specification obscure, the detailed explanations will be omitted.

Figure 1A:
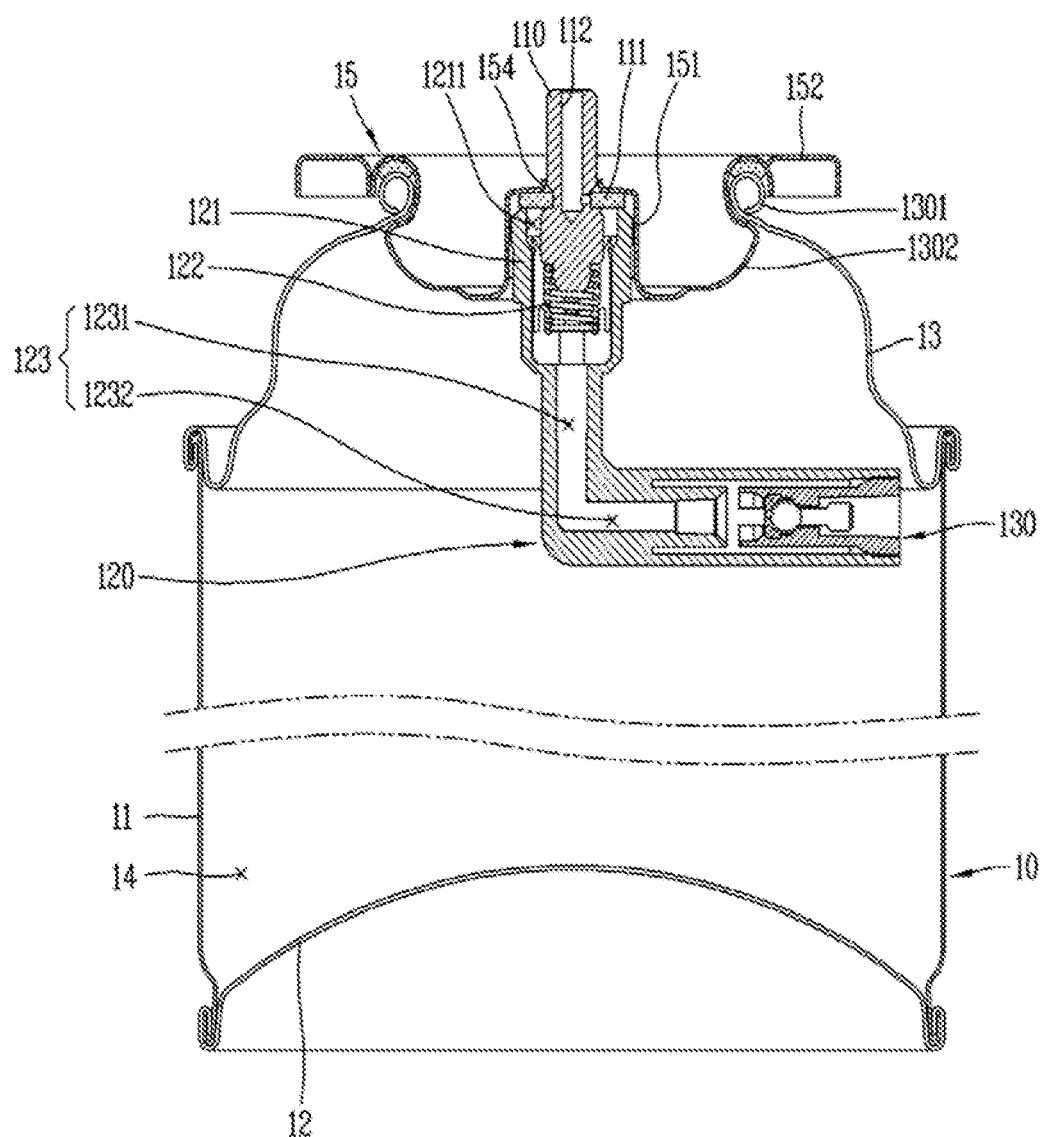
FIGS. 1A and 1B are sectional views showing an injection container having a valve assembly according to the present invention, respectively.
Figure 1B:
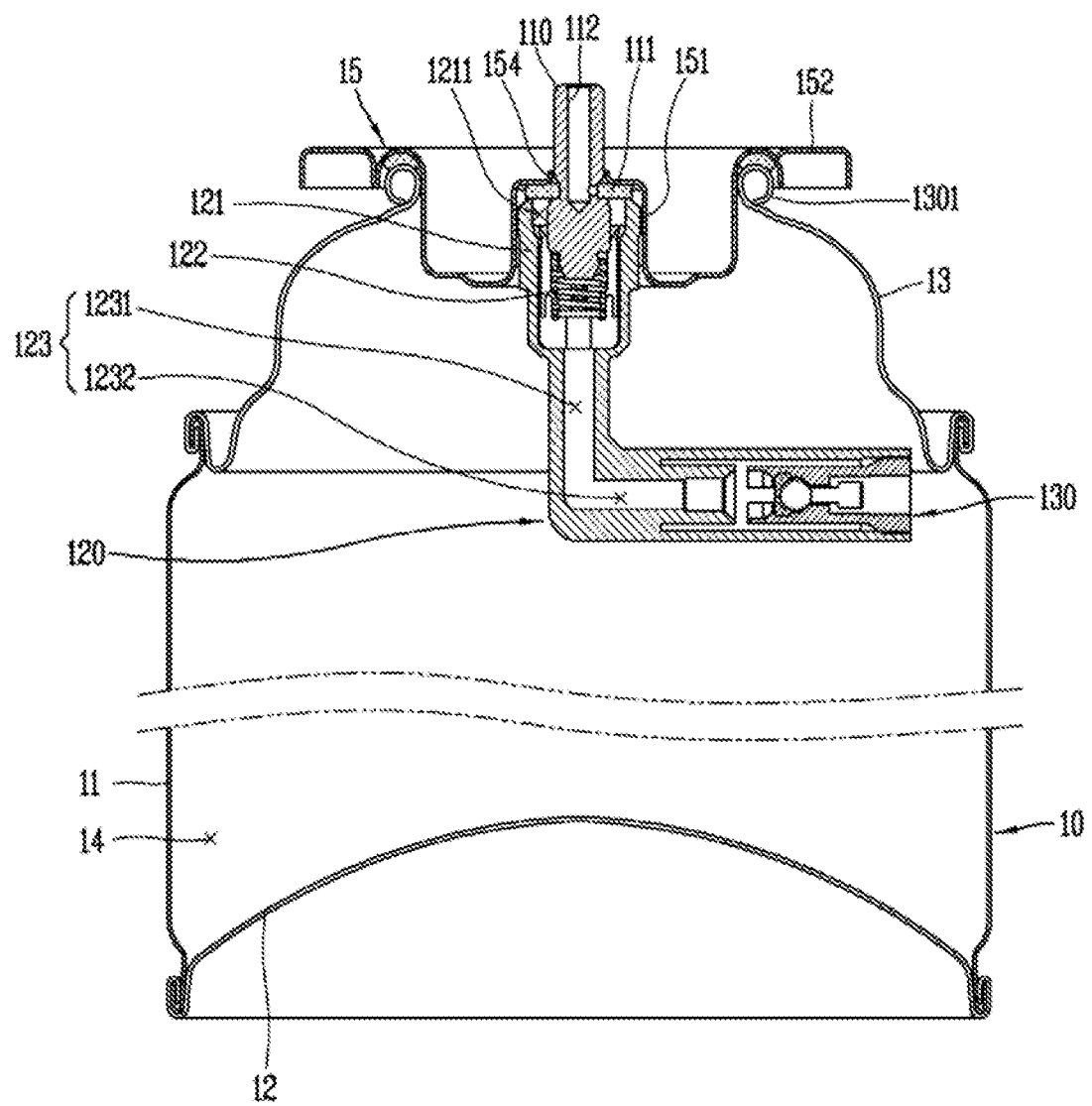

FIG. 1A is a sectional view showing an injection container having a valve assembly 100 according to one embodiment of the present invention, and FIG. 1B is a sectional view showing an injection container having a valve assembly 100 according to another embodiment of the present invention.

In FIGS. 1A and 1B, an intermediate part of side surfaces of the injection container in a lengthwise direction was deleted by two cutting lines under a judgment that it is unrelated to the features of the present invention and it is unnecessary in explaining the present invention. However, a part of the side surfaces of the injection container was deleted between the two cutting lines. Actually, the respective side surfaces of the injection container are extended in upper and lower directions, thereby being connected to each other.

Referring to FIG. 1A, a housing 10 of a cylindrical shape is provided with an accommodating space 14 therein, and is configured to accommodate therein contents such as fluid or gas and spraying gas.

The housing 10 includes a body 11 having the accommodating space 14, and a lower sealing cap 12 and an upper sealing cap 13 for sealing both ends of the body 11, respectively. The lower sealing cap 12 may be formed in a shape bent towards the accommodating space 14. According to this, when an overpressure more than a preset level is applied to the accommodating space 14, the lower sealing cap 12 may be transformed to increase a volume of the accommodating space 14.

The upper sealing cap 13 may be coupled to the body 11 so as to seal an upper part of the body 11. The upper sealing cap 13 may form a seaming coupling portion 1301 so as to be coupled with a mounting cup 15 in a bent or rolled manner. The seaming coupling portion is formed along the edge of the mounting cup 15. The body 11 may be coupled to a lower end of the upper sealing cap 13 in a neck-in type. In this case, the body 11 may be formed to extend in a straight line in a lengthwise direction.

The housing 10 may contain gas of a high pressure or fuel of a liquid state, and may be configured in the form of a metallic can which is capable of enduring a predetermined inner pressure. However, the present invention is not limited to this. The housing 10 may contain a pesticide, an aromatic, a beauty care product, etc.

Referring to FIG. 1A, the mounting cup 15 for supporting the valve assembly 100 is coupled to an upper end of the upper sealing cap 13.

The mounting cup 15 includes a locking shape portion 152 so as to be mounted to a fuel mounting device such as a gas range. And a protruding part 151 for fixing the valve assembly 100 is provided at an intermediate part of the mounting cup 15. However, in some cases, the locking shape portion 152 may not be provided, or may be configured in another form. For instance, as another form of the locking shape portion 152, in a case that a beauty care product or a pesticide, etc. is contained in the housing 10, a cap having a pressing button for injection may be mounted.

The mounting cup 15 is formed as a locking protrusion 1302 protrudes from a lower end of the seaming coupling portion 1301 of the upper sealing cap 13. The locking protrusion 1302 may be formed as the mounting cup 15 is assembled in a clamped manner when the mounting cup 15 is coupled to an injection container accommodating portion of a gas range.

Referring to FIG. 1B, in the injection container according to another embodiment of the present invention, a lower end of the upper sealing cap 13 may be coupled to the body 11 in a neck-out type. In the following descriptions, for convenience, an operation method of the valve assembly 100 will be explained on the basis of the injection container of FIG. 1A. However, the present invention is not limited to this, and it will be obvious to those skilled in the art that the present invention may be applicable to the injection container of FIG. 1B.

Figure 2:
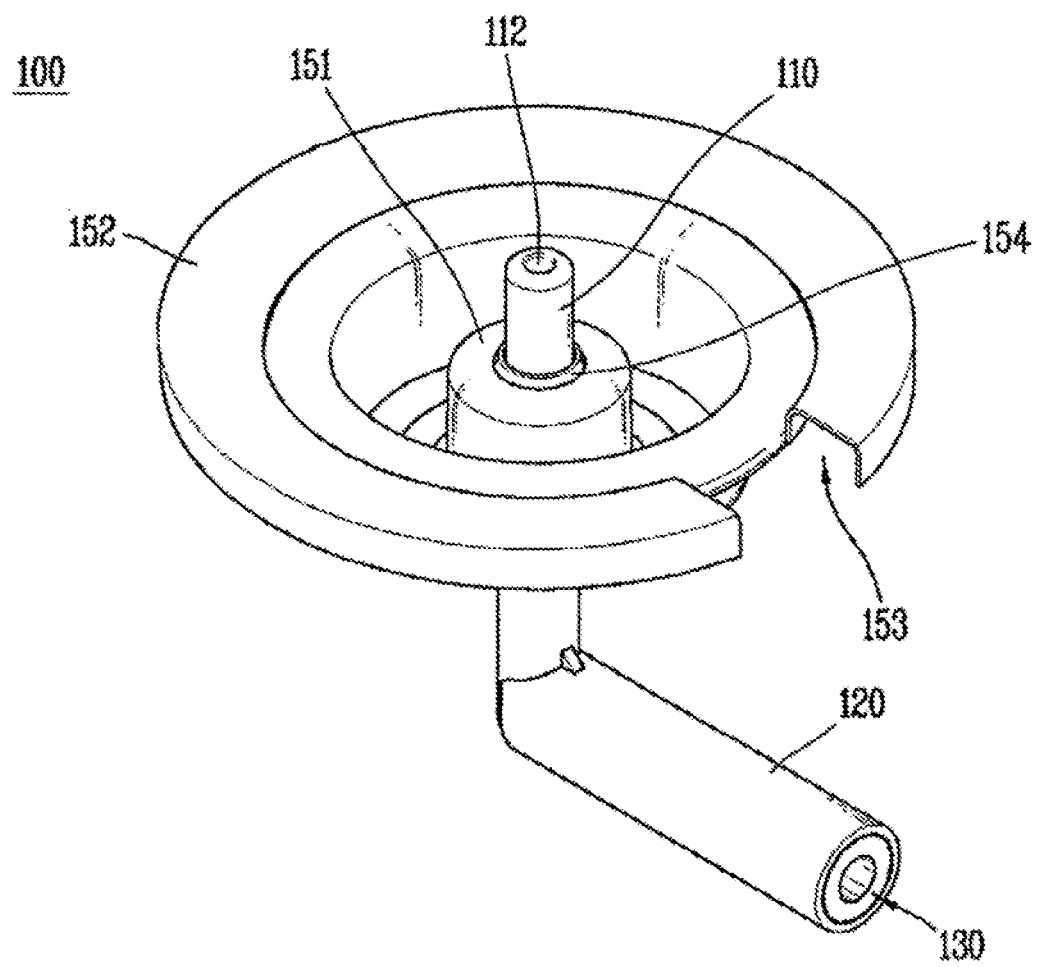
FIG. 2 is a perspective view showing a mounted state of a valve assembly to a mounting cup of FIG. 1A.
Figure 3:
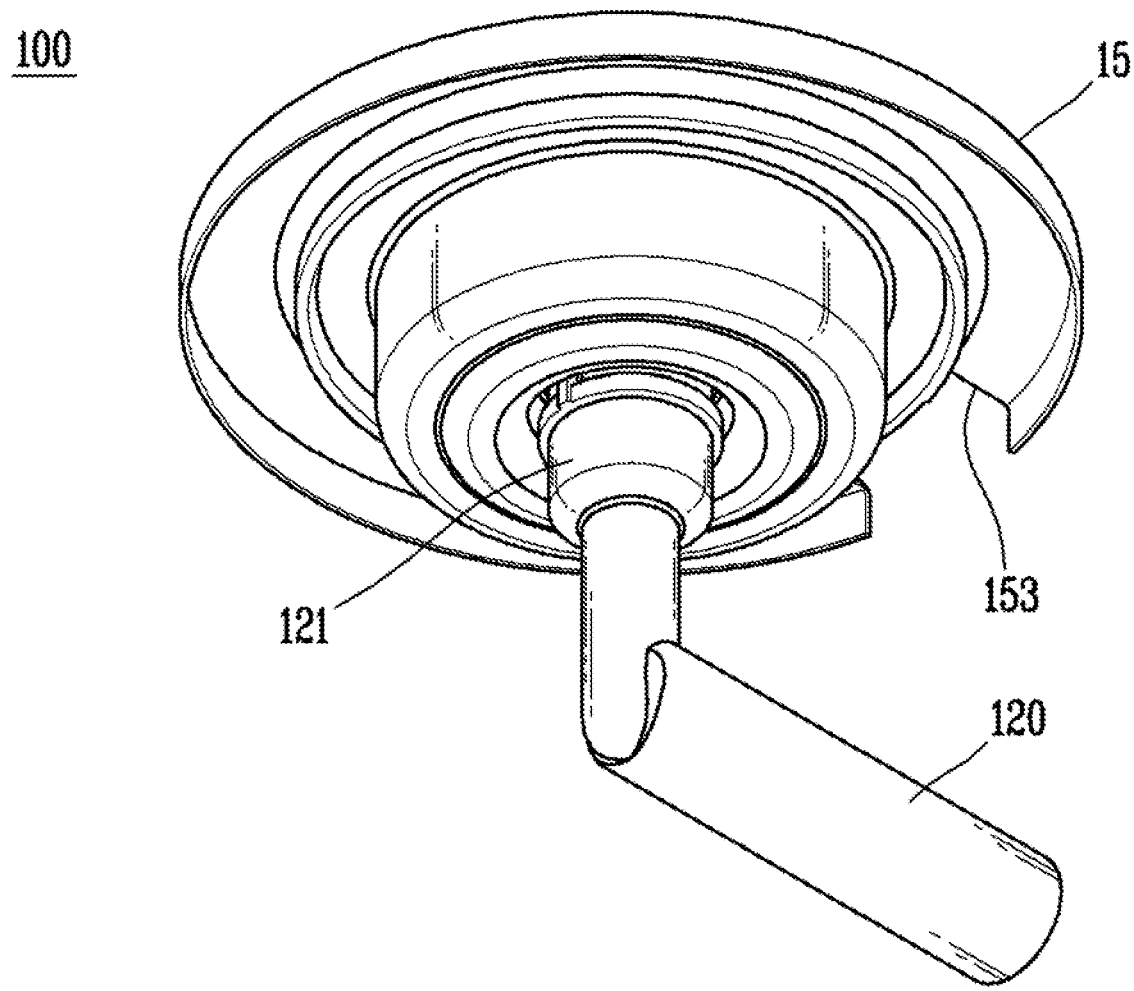
FIG. 3 is a bottom perspective view of the valve assembly of FIG. 2, which is viewed from the lower side.
Figure 4:
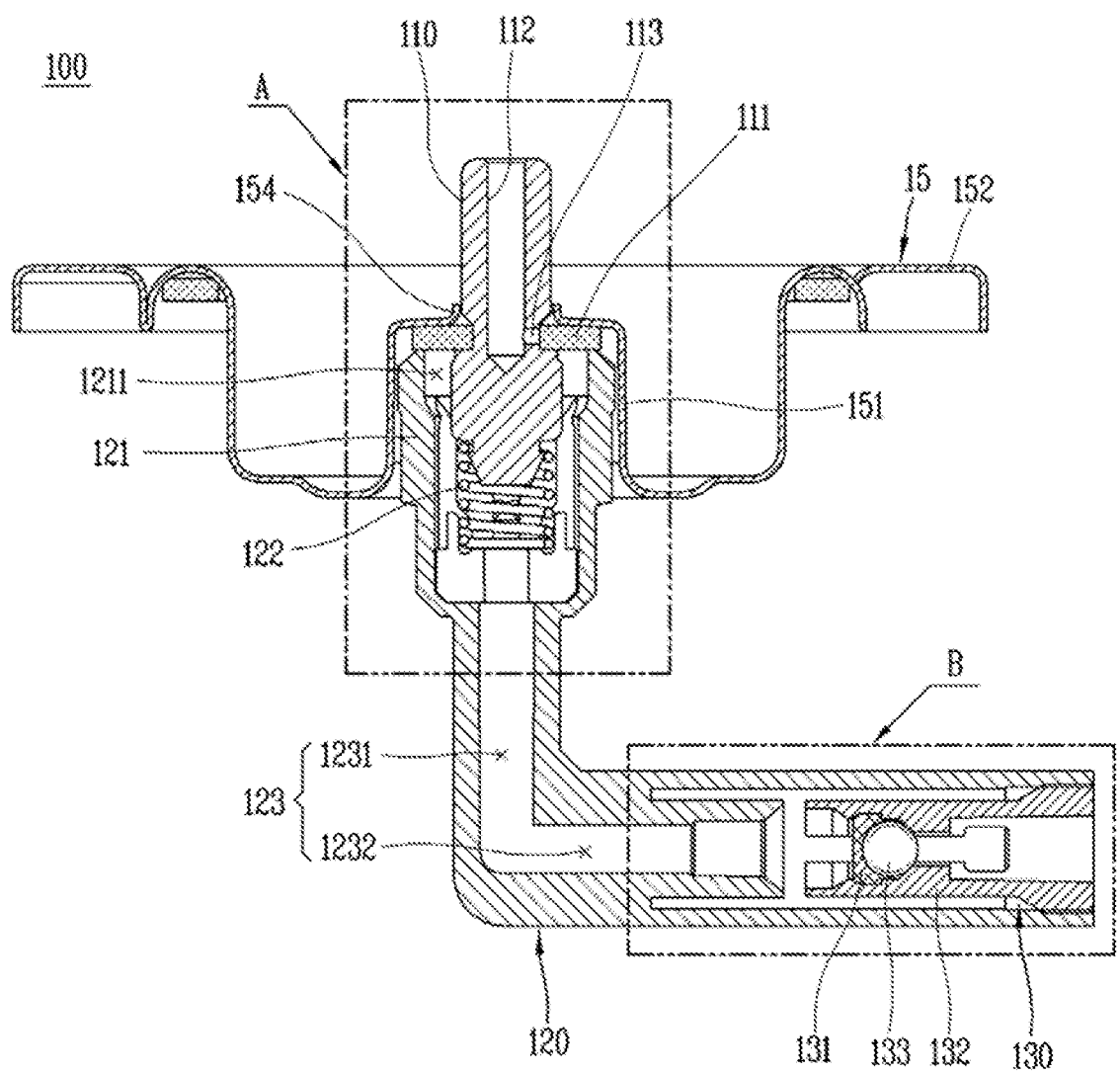
FIG. 4 is a sectional view of the valve assembly of FIG. 2.
Figure 5:
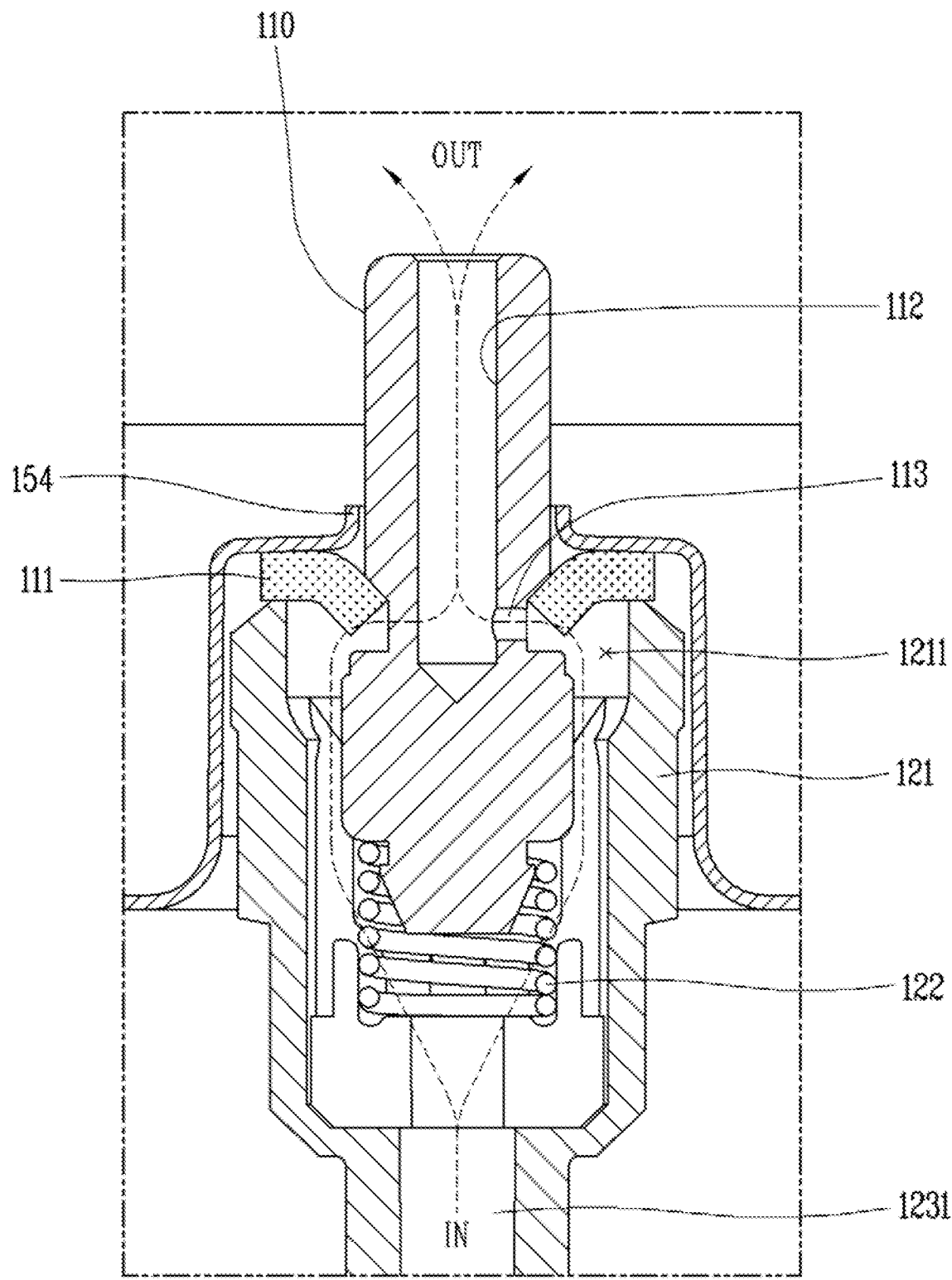
FIG. 5 is an enlarged view of part 'A' in FIG. 4.

FIG. 2 is a perspective view showing a mounted state of the valve assembly 100 to the mounting cup 15 of FIG. 1A. FIG. 3 is a bottom perspective view of the valve assembly 100 of FIG. 2, which is viewed from the lower side. FIG. 4 is a sectional view of the valve assembly 100 of FIG. 2. And FIG. 5 is an enlarged view of part 'A' in FIG. 4.

Referring to FIG. 2, the mounting cup 15 is provided with a notch groove 153 formed at one side of the locking shape portion 152, so as to be mounted to a gas range (or an external device for mounting the injection container). In a case that the injection container is mounted to an injection container accommodating portion of a gas range, the notch groove 153 is arranged so as to be towards an upper direction of the injection container accommodating portion.

The valve assembly 100 includes a valve stem 110 for injecting contents contained in the accommodating space 14 to the outside by being pressurized, and a stem housing 120.

A through hole 154 is formed at a central part of an upper end of the protruding part 151 of the mounting cup 15.

An opening/closing member 111 of a ring shape is mounted to an inner side surface of the upper end of the protruding part 151 of the mounting cup 15, so as to cover a part of the through hole 154.

The valve stem 110 is mounted to the upper end of the protruding part 151 of the mounting cup 15, so as to be slidable in upper and lower directions by the opening/closing member 111. An upper part of the valve stem 110 is exposed to the outside of the housing 10 by passing through a central hole of the opening/closing member 111 and the through hole 154. A lower part of the valve stem 110 is arranged to be accommodated in the upper end of the protruding part 151 of the mounting cup 15. A coupling groove is formed on a side surface of the valve stem 110 in a circumferential direction, and an inner circumferential part of the opening/closing member 111 is inserted into the coupling groove. And the valve stem 110 may be supported so as to be slidable in upper and lower directions by the opening/closing member 111.

An air discharge hole 112 is formed at an upper end of the valve stem 110 in a directly downward direction, and an orifice 113 is formed between a lower end of the air discharge hole 112 and the coupling groove. And the air discharge hole 112 may be communicated with the accommodating space 14 of the housing 10 through the orifice 113. Here, the opening/closing member 111 encloses the coupling groove of the valve stem 110, and may selectively open and close the orifice 113 by sliding of the valve stem 110.

The stem housing 120 includes a mounting portion 121 having a hollow portion 1211 therein, and a communication flow path 123 for communicating the hollow portion 1211 with the accommodating space 14 of the housing 10. The hollow portion 1211 may be selectively communicated with the air discharge hole 112 through the orifice 113.

A part of the mounting portion 121 is accommodated in the protruding part 151 of the mounting cup 15, and the mounting portion 121 is provided with the hollow portion 1211 therein. Under the configuration, a lower part of the valve stem 110 is arranged at the hollow portion 1211 so as to be slidable. Here, an upper end of the mounting portion 121 is configured to support an outer circumferential part of the opening/closing member 111.

A valve spring 122 is provided in the mounting portion 121, and the valve spring 122 is configured to elastically support the lower part of the valve stem 110.

The communication flow path 123 is provided in the stem housing 120, and the hollow portion 1211 is communicated with the accommodating space 14 of the housing 10 through the communication flow path 123.

The communication flow path 123 may be configured to include a first communication flow path portion 1231 extended in the same or similar direction as/to a lengthwise direction of the housing 10 or a sliding direction of the valve stem 110, and a second communication flow path portion 1232 extended from the first communication flow path portion 1231 in a side direction of the housing 10. The second communication flow path portion 1232 may be extended in a direction to cross a side surface of the housing 10. An upper end of the first communication flow path portion 1231 may be communicated with the hollow portion 1211, and an end part of the second communication flow path portion 1232 may be communicated with the accommodating space 14 by being arranged to be spaced from the upper sealing cap 13.

A gas discharge operation of the valve assembly 100 will be explained with reference to FIG. 5.

When the injection container is mounted to an injection container accommodating portion of a gas range (or an external device) in a lying manner horizontally, the notch groove 153 of the mounting cup 15 is arranged towards an upper direction of the injection container accommodating portion, and the second communication flow path portion 1232 of the stem housing 120 is also arranged towards the upper direction.

In case of an injection container using liquid fuel, liquid fuel may sink in a gravitational direction while it is being used. And gas fuel evaporated to an upper space of the accommodating space 14 on the basis of a virtual lengthwise central line of the housing 10 may be introduced into the hollow portion 1211 through the second communication flow path portion 1232 and the first communication flow path portion 1231.

The valve stem 110 may be pressurized in a lengthwise direction of the housing 10. By the pressurization, the valve spring 122 is compressed and the valve stem 110 is slid towards the accommodating space 14. An inner circumferential part of the opening/closing member 111 is pushed to the accommodating space 14 by the sliding of the valve stem 110. Accordingly, the orifice 113 is opened, so that the gas fuel in the accommodating space 14 may be outwardly injected through the valve stem 110 at the hollow portion 1211 of the stem housing 120. When the pressurization is released, the injection of the contents may be stopped.

The valve assembly 100 of the present invention may further include a flow path blocking valve 130 formed to block an inlet of the communication flow path of the stem housing, in order to relieve an overpressure state of the accommodating space 14. Hereinafter, the flow path blocking valve 130 will be explained in more detail with reference to FIGS. 6A to 7B.

Figure 6A:
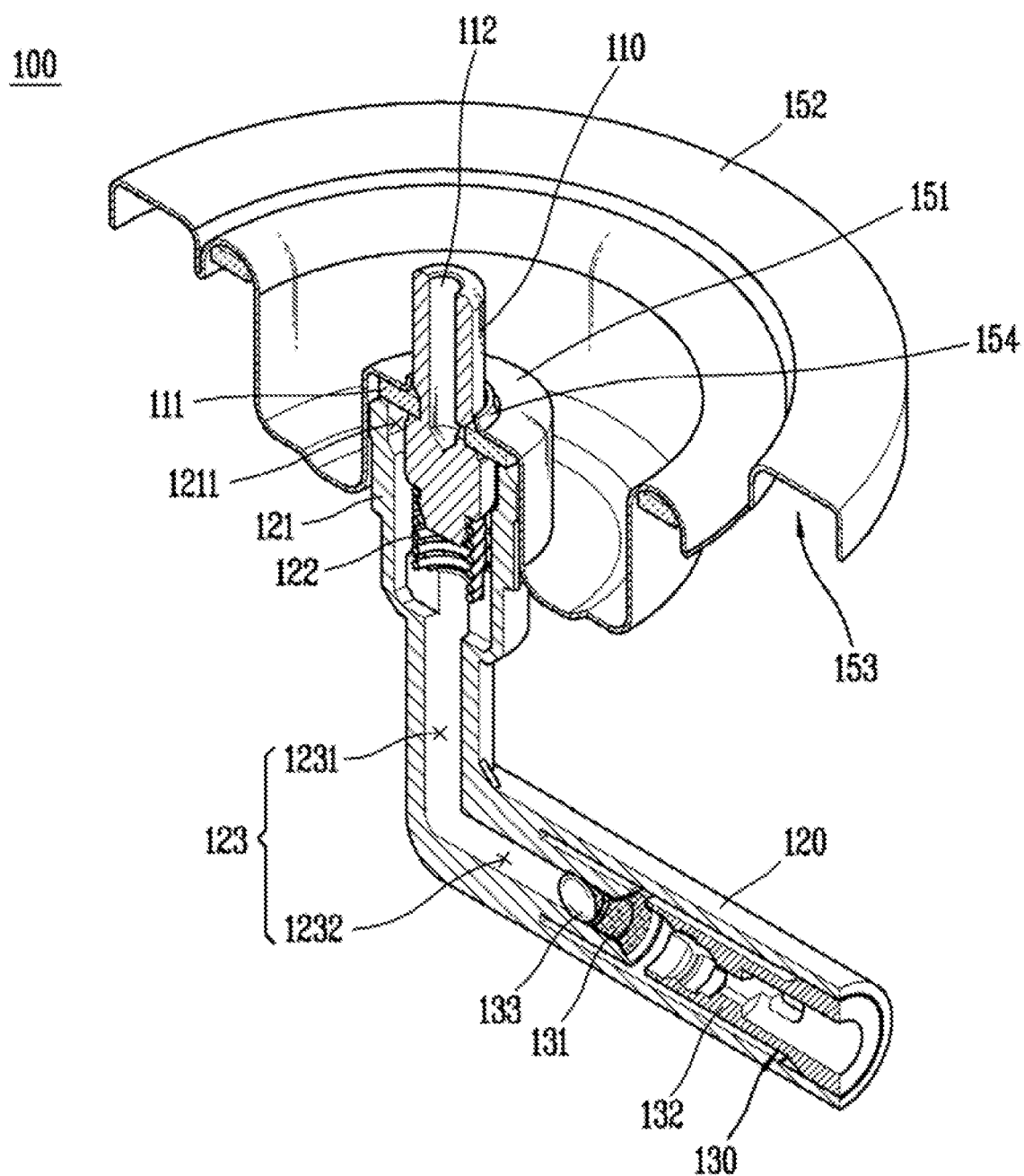
FIG. 6A is a perspective view showing a sectional view of the valve assembly of FIG. 4, in a blocked state of a communication flow path.
Figure 6B:
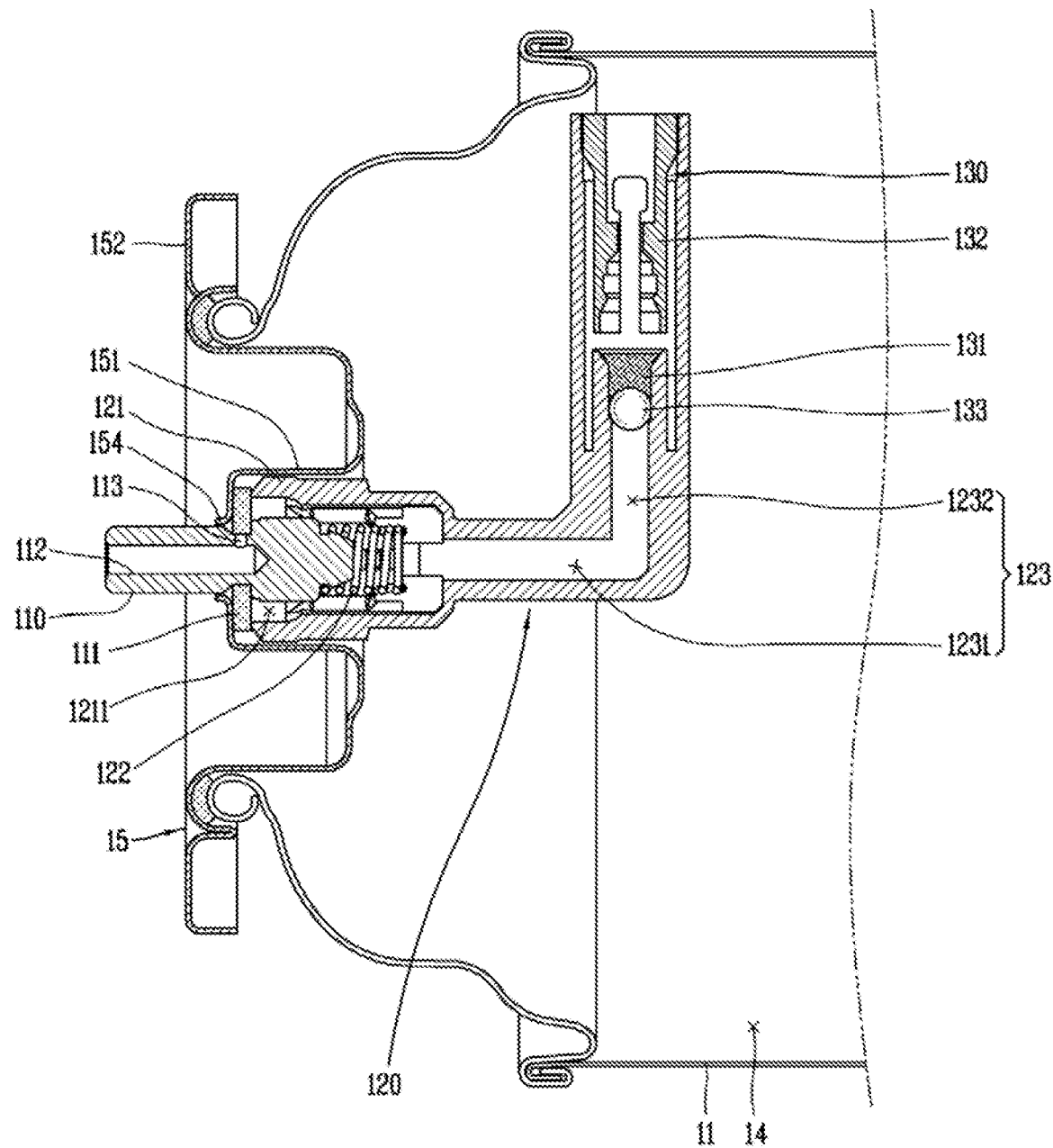
FIG. 6B is a conceptual view showing a mounted state of the injection container according to the present invention to an injection container accommodation portion.
Figure 7A:
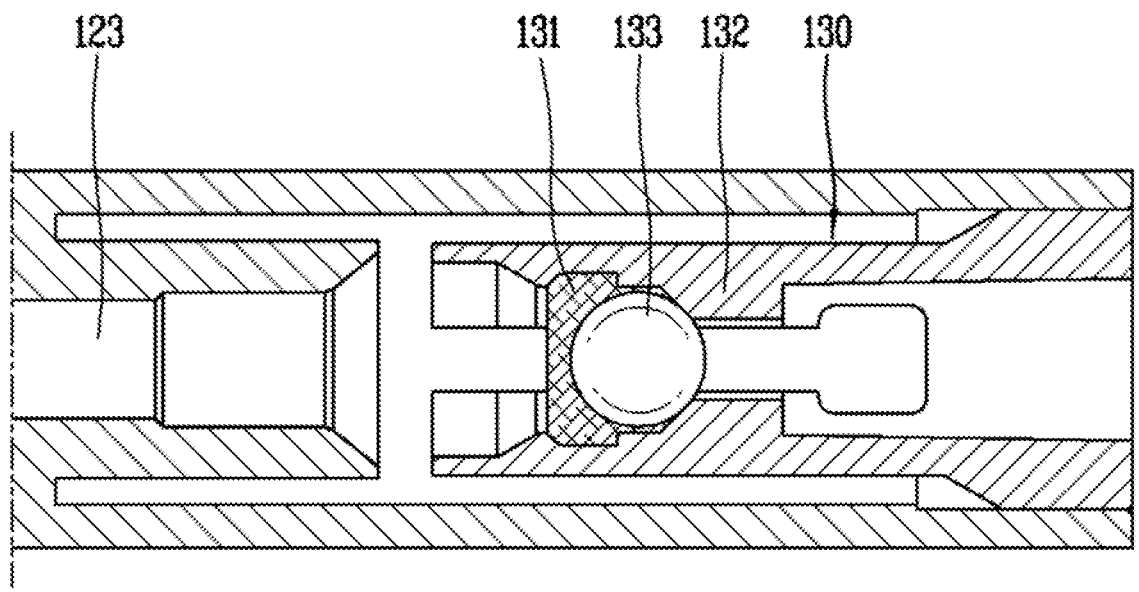
FIGS. 7A and 7B are enlarged views of 'B' in FIG. 4, which show a state before an overpressure occurs in an accommodation space and a state after the overpressure is relieved (solved), respectively.
Figure 7B:
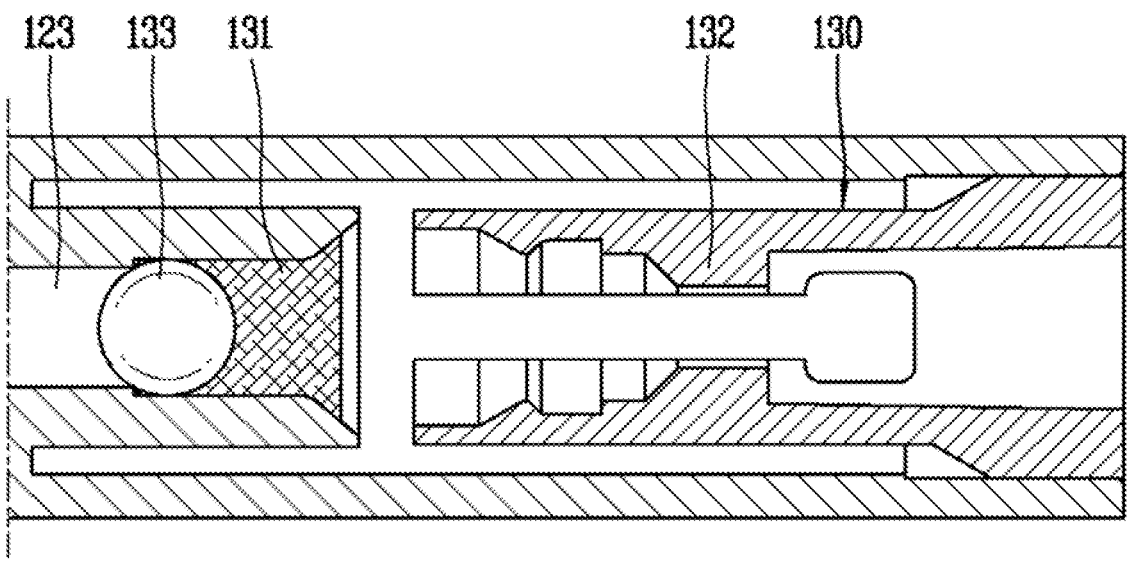

FIG. 6A is a perspective view showing a sectional view of the valve assembly 100 of FIG. 4, in a blocked state of the communication flow path 123. FIG. 6B is a conceptual view showing a mounted state of the injection container according to the present invention to an injection container accommodation portion. And FIGS. 7A and 7B are enlarged views of 'B' in FIG. 4, and are conceptual views showing a state before an overpressure occurs in the accommodation space 14 and a state after the overpressure is relieved, respectively.

The injection container according to the present invention may reach an overpressure state due to thermal, mechanical or chemical reasons during usage or storage. In this case, the flow path blocking valve 130 may block the stem housing 120 so that contents inside the accommodating space 14 of the housing 10 may not leak to the outside.

The flow path blocking valve 130 is installed to be inserted into the communication flow path 123 of the stem housing 120 in parallel, thereby serving to selectively block a point of a passage where gas inside the accommodating space 14 is discharged to the outside.

Here, the insertion part of the flow path blocking valve 130 to the communication flow path 123 may be a part arranged in a gravitational direction, for movement of a closing member 133 which may be formed as a hard sphere in the gravitational direction, as a locked state is released when the injection container is mounted to an external device.

More specifically, when the injection container is mounted to an injection container accommodating portion of a gas range (or an external device) in a lying manner horizontally, the flow path blocking valve 130 is arranged such that the notch groove 153 of the mounting cup 15 is arranged towards an upper direction of the injection container accommodating portion, and the second communication flow path portion 1232 of the stem housing 120 is also arranged towards the upper direction. Here, the flow path blocking valve 130 may be inserted into the second communication flow path portion 1232 arranged towards the upper direction (that is, the gravitational direction). Thus, the flow path blocking valve 130 is arranged in a gravitational direction, and the closing member 133 such as a hard sphere disposed in the flow path blocking valve 130 may move in the gravitational direction by gravity towards the inlet when its locked state is released.

The flow path blocking valve 130 may include a melting portion 131, a body 132, and the closing member 133.

The melting portion 131 is configured to be arranged at a part on the communication flow path 123 in a solid state, the part connected to the inlet of the communication flow path 123, in a normal state rather than an overpressure state where an inner pressure of the injection container exceeds a preset level. And the melting portion 131 is configured to move by changing into a liquid state by being melted when an overpressure state occurs in the injection container and an inner temperature of the injection container is increased to a level more than a preset temperature. The melting portion 131 may be formed of a material which has a phase change from a solid state to a liquid state at a temperature of 110° C., for instance. Here, the melting portion 131 may be formed of thermoplastic resin.

When an overpressure state occurs in the injection container, a moving path of the melting portion 131 which is melted by receiving heat is formed between the flow path blocking valve 130 and the communication flow path 123, such that the melting portion 131 in a solid state melts, moves, and is solidified to block at least a part of the communication flow path 132.

The body 132 is formed such that one side thereof is connected to the communication flow path 123, and another side thereof is connected to the accommodation space 14, and is configured to selectively discharge contents of the accommodation space 14 to the outside of the housing 10 through the flow path blocking valve 130.

An outer diameter of the body 132 may have a size corresponding to an inner diameter of the communication flow path 123, so as to be fitted into the communication flow path 123. At least a part of an outer circumferential surface of the body 132 may be formed such that fluid is moveable therealong. Accordingly, contents inside the accommodation space 14 may move to the communication flow path 123 of the stem housing 120.

The closing member 133 is configured to be accommodated in the body 132. And the closing member 133 and the inlet of the communication flow path 123 may be formed such that facing surfaces thereof contact each other after the closing member 133 moves to the inlet of the communication flow path 123 to block a movement of gas which flows along the communication flow path 123. Accordingly, a blocking performance of the communication flow path 123 may be enhanced more.

For instance, as shown, the closing member 133 may be formed to have a spherical shape such as a hard sphere. However, the present invention is not limited to this. That is, the closing member 133 may be formed to have a conical shape to block the communication flow path 123 in correspondence to the inlet of the communication flow path 123, or may be formed to have a cylindrical shape having a sectional surface decreased towards the communication flow path 123.

The closing member 133 may be formed of a material having a higher melting point than the melting portion 131. For instance, in a case that the melting portion 131 is formed of a material having a melting point of 110° C. the closing member 133 may be formed of thermoplastic resin or a metallic material having a melting point more than 110° C. Accordingly, if heat of a temperature higher than a preset level is applied to the melting portion 131 and the closing member 133 due to the occurrence of an overpressure state, the melting portion 131 may be firstly melted, and then the closing member 133 may move towards the communication flow path 123 while maintaining a solid state (the initial state when it is formed).

In order to enhance a blocking performance of the communication flow path 123 by the closing member 133, at least one of the closing member 133 and the inlet of the communication flow path 123 may be formed of a magnetic material such that an attractive force is applied between the closing member 133 and the inlet of the communication flow path 123. Under the configuration, when an overpressure occurs in the injection vessel, the closing member 133 moves towards the communication flow path 123 more rapidly. This may solve the overpressure state more rapidly, and may allow the blocked state of the communication flow path 123 to be maintained stably as the fixed state of the closing member 133 which has moved to the communication flow path 123 is maintained. Thus, a probability of an accident occurrence due to an overpressure state of the injection container may be significantly reduced.

Here, the closing member 133 may be formed such that at least a part thereof is fixed to the melting portion 131, so as to block the communication flow path 123 by moving to the inlet of the communication flow path 123, in a case that an inner temperature of the accommodation space 14 is increased to a level more than a preset temperature due to the occurrence of an overpressure state. Under the configuration of the melting portion 131 and the closing member 133, when an overpressure state occurs in the injection container, the melting portion 131 is melted by heat transferred to the melting portion 131 of a solid state. Then, the closing member 133 fixed to the melting portion 131 is detached from the melting portion 131, and moves towards the inlet of the communication flow path 123 along a moving path disposed between the flow path blocking valve 130 and the communication flow path 123. As a result, the communication flow path 123 is blocked primarily.

As shown in FIG. 7B, the melted melting portion 131 of a liquid state flows along the moving path, thereby filling a micro gap between the closing member 133 and the inlet of the communication flow path 123. And the melting portion 131 is solidified as the temperature is lowered due to a release of the overpressure state. Consequently, the flow path blocking valve 130 operates when an overpressure state occurs in the injection container, and is configured to completely block a gas flow in the communication flow path 123 by primarily blocking the communication flow path 123 by the closing member 133, and by secondarily blocking the communication flow path 123 by the melting portion 131. Further, the solidified melting portion 131 may stably maintain the blocked state of the communication flow path 123 by preventing an unnecessary movement of the closing member 133.

The melting portion 131 may be disposed between the inlet of the communication flow path 123 and the closing member 133, so as to prevent a movement of the closing member 133 in a solid state before the melting. Thus, even if the closing member 133 is unexpectedly separated from the melting portion 131 due to an external impact applied to the injection container, a malfunction of the flow path blocking valve 130 may be prevented as the melting portion 131 of the solid state prevents a movement of the closing member 133 towards the communication flow path 123. Here, the melting portion 131 may be disposed at a rear end of the closing member 133, a side of the inlet of the flow path blocking valve 130, not a position between the inlet of the communication flow path 123 and the closing member 133.

Further, since the closing member 133 is formed in a fixed manner to the melting portion 131, a structure to additionally fix the closing member 133 to the body 132 is not required. This may reduce the costs required to manufacture the flow path blocking valve 130, thereby enhancing economical efficiency.

Hereinafter, an injection container having a flow path blocking valve 230 according to another embodiment of the present invention will be explained with reference to FIGS. 8A to 8C.

Figure 8A:
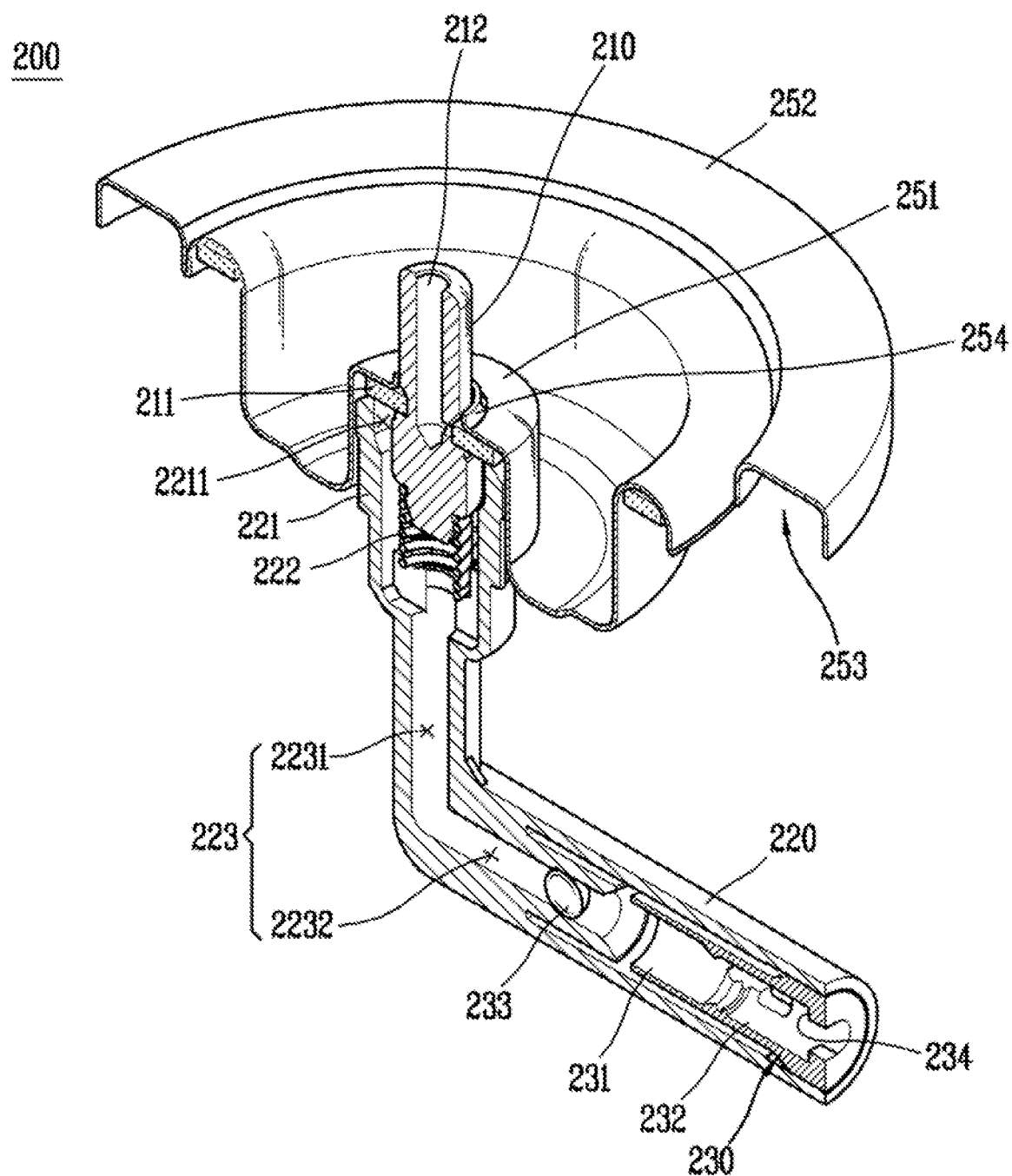
FIG. 8A is a perspective view showing a sectional surface of a valve assembly according to another embodiment of the present invention, in a blocked state of a communication flow path.

FIG. 8A is a perspective view showing a sectional surface of a valve assembly 200 according to another embodiment of the present invention, in a blocked state of a communication flow path 223. And FIGS. 8B and 8C are enlarged views of the flow path blocking valve 230 of the valve assembly 200 shown in FIG. 8A, and are conceptual views which show a state before an overpressure occurs in the accommodation space 14 and a state after the overpressure is relieved, respectively.

Figure 8B:
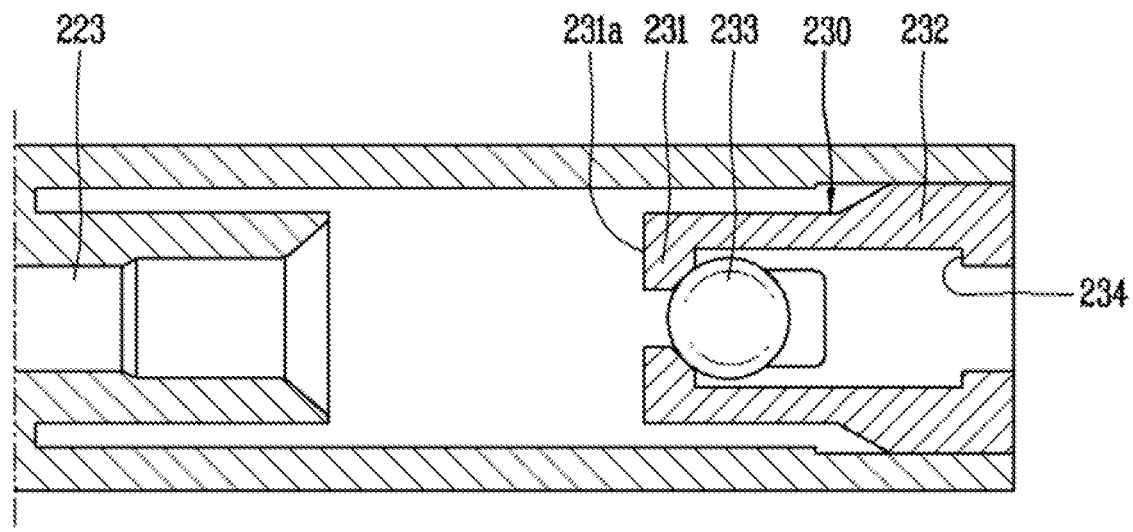
FIGS. 8B and 8C are enlarged views of a flow path blocking valve of the valve assembly shown in FIG. 8A, and are conceptual views which show a state before an overpressure occurs in an accommodation space and a state after the overpressure is relieved, respectively.
Figure 8C:
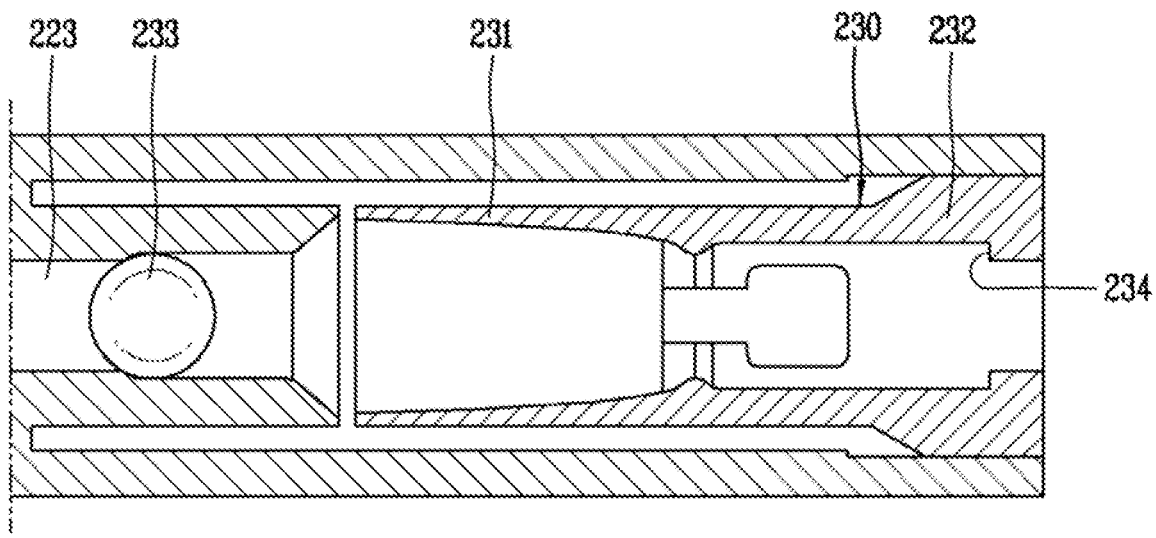

Referring to FIGS. 8A to 8C, the injection container includes a housing 10, a mounting cup 15, a stem housing 220, a valve stem 210 and a flow path blocking valve 230. An opening/closing member 211, an air discharge hole 212, a mounting portion 221, a hollow portion 2211, a valve spring 222, a communication flow path 223 having a first communication flow path portion 2231 and a second communication flow path portion 2232, a protruding part 251, a locking shape portion 252, a notch groove 253, and a through hole 254, which are shown in FIGS. 8A to 8C, may be formed to have the same or similar features as or to the opening/closing member 111, the air discharge hole 112, the mounting portion 121, the hollow portion 1211, the valve spring 122, the communication flow path 123 having the first communication flow path portion 1231 and the second communication flow path portion 1232, the protruding part 151, the locking shape portion 152, and the notch groove 153, and the through hole 154 which have been aforementioned with reference to FIGS. 1A to 7B.

The flow path blocking valve 230 includes a body 232, a closing member 233, and a melting portion 231.

The body 232 may be formed to be inserted into an inlet of the communication flow path 223, and may be formed to be communicated with the accommodation space 14.

The closing member 233 may be formed to be accommodated in a space provided in the body 232.

The melting portion 231 is arranged on a flow path connected to the inlet of the communication flow path 223 in a solid state, and is formed to melt from a solid state to a liquid state at a temperature more than a preset level.

Here, the melting portion 231 may be provided with a locking portion 231a.

As shown in FIG. 8B, the locking portion 231a is formed to have a hook shape before the melting portion 231 melts in a solid state, and is formed to support one side of the closing member 233 which is towards the communication flow path 223, such that the closing member 233 moves to the inlet of the communication flow path 223 to block the communication flow path 223, in a case that a temperature inside the accommodation space 14 of the housing 10 is increased to a level more than a preset temperature.

Further, the flow path blocking valve 230 may be further provided with a stair-stepped portion 234 protruding from a rear end of the body 232, i.e., the inlet communicated with the accommodation space 14, for prevention of separation of the closing member 233. That is, the stair-stepped portion 234 is provided to prevent the closing member 233 from being inserted into the accommodation space 14 through a rear end of the flow path blocking valve 230, in a state that the closing member 233 is accommodated in the body 232, or even after a locked state of the closing member 233 is released after the locking portion 231a of the melting portion 231 melts by receiving heat generated at the time of an overpressure state.

Hereinafter, an injection container having a flow path blocking valve 330 according to still another embodiment of the present invention will be explained with reference to FIGS. 9A to 9C.

Figure 9A:
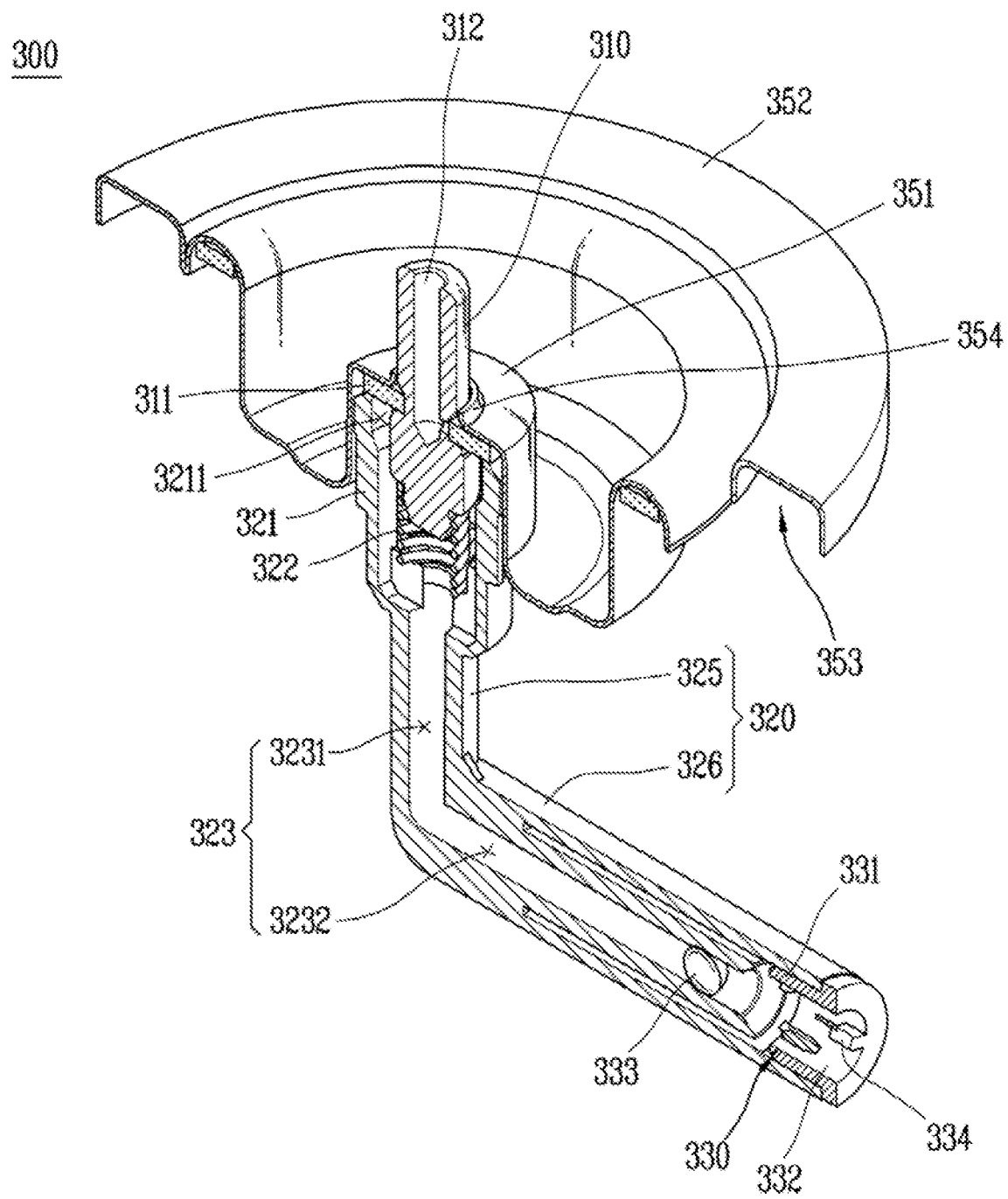
FIG. 9A is a perspective view showing a sectional surface of a valve assembly according to still another embodiment of the present invention, in a blocked state of a communication flow path.

FIG. 9A is a perspective view showing a sectional surface of a valve assembly 300 according to still another embodiment of the present invention, in a blocked state of a communication flow path 323. And FIGS. 9B and 9C are enlarged views of the flow path blocking valve 330 of the valve assembly 300 shown in FIG. 9A, and are conceptual views which show a state before an overpressure occurs in the accommodation space 14 and a state after the overpressure is relieved, respectively.

Figure 9B:
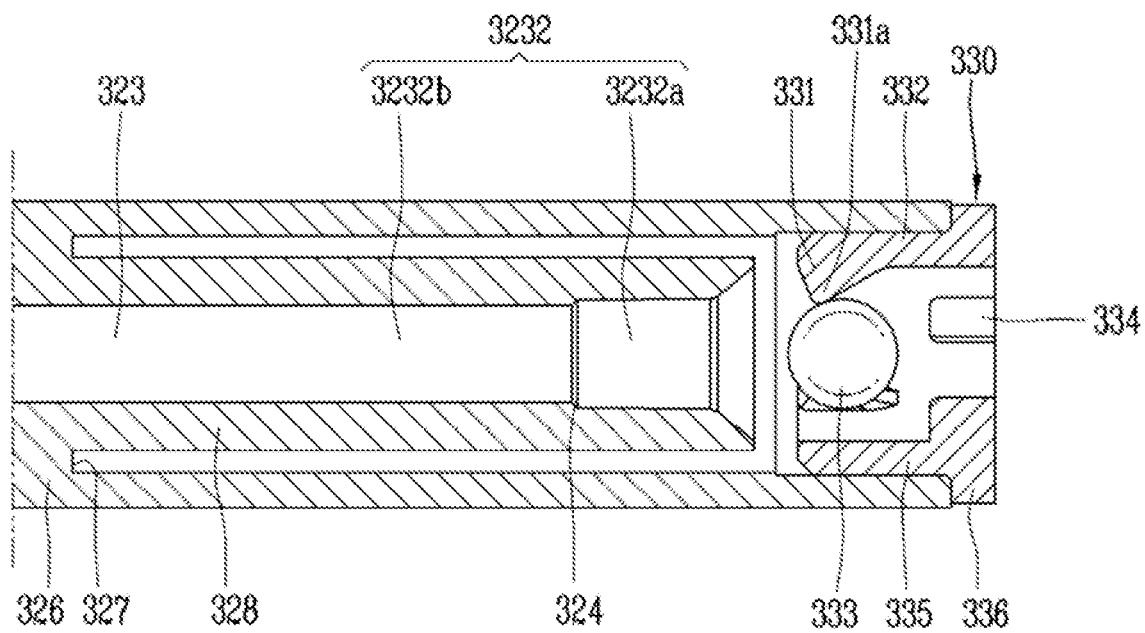
FIGS. 9B and 9C are enlarged views of a flow path blocking valve of the valve assembly shown in FIG. 9A, and are conceptual views which show a state before an overpressure occurs in an accommodation space and a state after the overpressure is relieved, respectively.
Figure 9C:
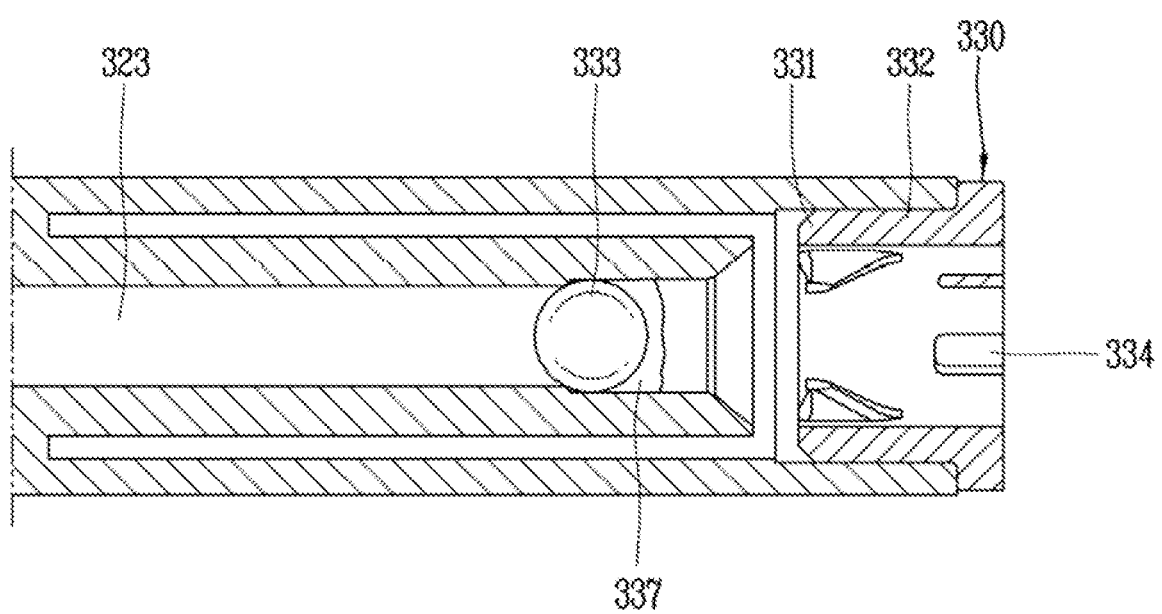

Referring to FIGS. 9A to 9C, the injection container includes a housing 10, a mounting cup 15, a stem housing 320, a valve stem 310 and a flow path blocking valve 330. An opening/closing member 311, an air discharge hole 312, a mounting portion 321, a hollow portion 3211, a valve spring 322, a communication flow path 323 having a first communication flow path portion 3231 and a second communication flow path portion 3232, a protruding part 351, a locking shape portion 352, a notch groove 353, and a through hole 354, which are shown in FIGS. 9A to 9C, may be formed to have the same or similar features as or to the opening/closing member 111, the air discharge hole 112, the mounting portion 121, the hollow portion 1211, the valve spring 122, the communication flow path 123 having the first communication flow path portion 1231 and the second communication flow path portion 1232, the protruding part 151, the locking shape portion 152, the notch groove 153, and the through hole 154 which have been aforementioned with reference to FIGS. 1A to 7B.

The flow path blocking valve 330 includes a body 332, a closing member 333, and a melting portion 331.

The body 332 may be formed to be inserted into an inlet of the communication flow path 323, and may be formed to be communicated with the accommodation space 14.

The closing member 333 may be formed to be accommodated in a space provided in the body 332.

The melting portion 331 is arranged on a flow path connected to the inlet of the communication flow path 323 in a solid state, and is formed to melt from a solid state to a liquid state at a temperature more than a preset level.

Here, the melting portion 331 may be provided with a locking portion 331a.

As shown in FIG. 9B, the locking portion 331a is formed to have a hook shape before the melting portion 331 melts in a solid state, and is formed to support one side of the closing member 333 which is towards the communication flow path 323, such that the closing member 333 moves to the inlet of the communication flow path 323 to block the communication flow path 323, in a case that a temperature inside the accommodation space 14 of the housing 10 is increased to a level more than a preset temperature.

Further, the second communication flow path portion 3232 is formed to have its width narrowed on at least a part in a gravitational direction or in a contents-passing direction, such that the closing member 333 introduced to the communication flow path 323 is locked in the communication flow path 323. For instance, the second communication flow path portion 3232 may be provided with a first flow path 3232a, and a second flow path 3232b having a smaller inner diameter than the first flow path 3232a. Further, the first flow path 3232a may have a larger inner diameter than the closing member 333, and the second flow path 3232b may have a smaller inner diameter than the closing member 333.

The first flow path 3232a may be a flow path disposed between the second flow path 3232b and the flow path blocking valve 330. Under the structure, a locking jaw 324 may be formed at the end of the first flow path 3232a, and the closing member 333 may be mounted to the locking jaw 324 (refer to FIG. 9C).

The stem housing 320 may include a first housing 325 having the first communication flow path portion 3231, and a second housing 326 having the second communication flow path portion 3232. And the first housing 325 and the second housing 326 may be formed to be perpendicular to each other.

In this case, an inlet of the second housing 326 may be the inlet of the communication flow path 323, and at least a part of the flow path blocking valve 330 is inserted into the inlet of the second housing 326.

The second housing 326 may be provided with a housing groove 327 recessed from the inlet, and a cylindrical protrusion part 328 may protrude from the bottom of the housing groove 327. The second communication flow path portion 3232 is formed in the cylindrical protrusion part 328. Under the structure, an inlet of the first flow path 3232a of the second communication flow path portion 3232, and the flow path blocking valve 330 face each other at positions spaced from each other in the housing groove 327.

The flow path blocking valve 330 may be fitted into the housing groove 327. More specifically, the body 332 of the flow path blocking valve 330 may include an insertion body 335 inserted into the housing groove 327, and a circumference protrusion 336 protruding from the end of the insertion body 335. Once the insertion body 335 is inserted into the housing groove 327, the circumference protrusion 336 is configured to face the end of the second housing 326.

Furthermore, the melting portion 331 is arranged at a part of the flow path blocking valve 330 in a solid state, in a normal state rather than an overpressure state that an inner pressure of the injection container exceeds a preset level. In this embodiment, the melting portion 331 is integrally formed with the insertion body 335 with the same material. However, the present invention is not limited to this. That is, the melting portion 331 may be formed of a different material from the insertion body 335.

More specifically, the melting portions 331 are formed to protrude from an inner circumferential surface of the insertion body 335, and the melting portions 331 are sequentially arranged to be spaced from each other along the inner circumferential surface. An interval of the locking portion 331a where the end of the melting portion 331 is formed (an interval of the flow path in a diameter direction) is formed to be smaller than a size of the closing member 333. Thus, the closing member 333 is fixed to the locking portion 331a.

In a case that an inner temperature of the injection container is increased to a level more than a preset temperature due to an overpressure, the melting portion 331 changes into a liquid state by melting, and moves towards the second communication flow path portion 3232.

The melting portion 331 may be formed of a material having a melting point of about 100~120° C. for instance. For this, the melting portion 331 may be provided with a polyethylene (PE) material having a melting point of about 103° C. and a hard material having a higher melting point than the polyethylene material. The hard material having a higher melting point than the polyethylene material may be polypropylene (PP) or polystyrene (PS), for instance.

The PE material and the hard material are mixed with each other with a preset ratio. As an example, the PE material and the hard material may be mixed with each other with a preset ratio of 7:3. By the mixture of the aforementioned materials, the melting portion 331 may have a melting point of about 110° C.

According to experiments using an overheated grill 10, samples underwent a flow path blocking from radiant heat at a temperature of about 100° C. An inner pressure of a can was increased by radiant heat, and then was decreased by a flow path blocking. An average operation temperature of the 10 samples was 111.8° C. and it was shown that the flow path was blocked by falling of the closing member 333, and the flow path was blocked in a double manner as the melting portion 331 encloses the closing member 333.

That is, the closing member 333 falls onto the second communication flow path portion 3232 to thus be mounted to the locking jaw 324, as an accommodated state of the closing member 333 in the body 332 is released, or as a locked state of the closing member 333 is released as the locking portion 331a of the melting portion 331 melts by receiving heat generated at the time of an overpressure state. Further, as the melting portion 331 melts to cover at least a part of the closing member 333 and to cover an inner side wall of the second communication flow path portion 3232, a melting portion blocking portion 337 is formed. By the operation, a double blocking structure of the closing member 333 and the melting portion blocking portion 337 is formed.

In a case that only the melting portion is provided without such a double blocking structure, the melting portion melts by radiant heat to block the flow path. However, the flow path is re-open as the melting portion pierces the flow path by an inner pressure. Thus, the double blocking structure according to this embodiment may more enhance the stability.

Further, the flow path blocking valve 330 may be further provided with a stair-stepped portion 334 protruding from a rear end of the body 332, i.e., the inlet communicated with the accommodation space 14, for prevention of separation of the closing member 333. That is, the stair-stepped portion 334 is provided to prevent the closing member 333 from being inserted into the accommodation space 14 through a rear end of the flow path blocking valve 330, in a state that the closing member 333 is accommodated in the body 332, or even after a locked state of the closing member 333 is released after the locking portion 331a of the melting portion 331 melts by receiving heat generated at the time of an overpressure state.

Hereinafter, an injection container having a flow path blocking valve 430 according to yet still another embodiment of the present invention will be explained with reference to FIGS. 10A to 10D.

Figure 10A:
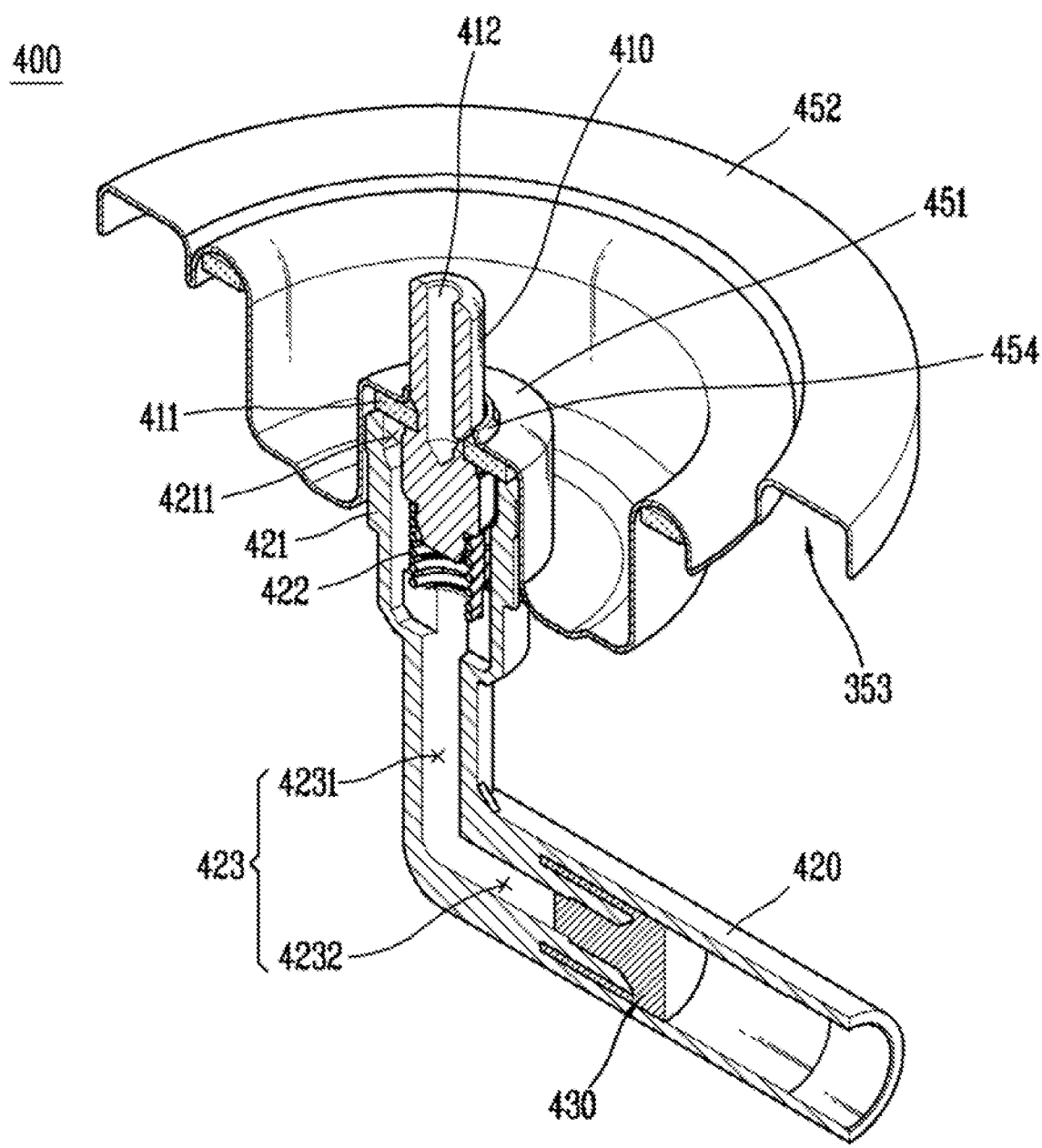
FIG. 10A is a perspective view showing a sectional surface of a valve assembly according to yet still another embodiment of the present invention, in a blocked state of a communication flow path.
Figure 10B:
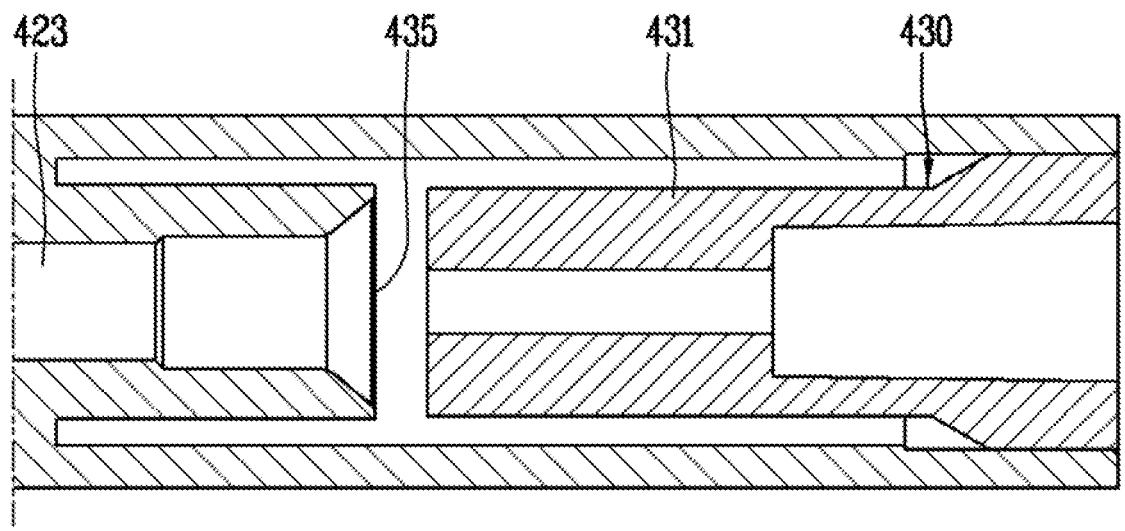
FIGS. 10B and 10C are enlarged views of a flow path blocking valve of the valve assembly shown in FIG. 10A, and are conceptual views which show a state before an overpressure occurs in an accommodation space and a state after the overpressure is relieved, respectively.
Figure 10C:
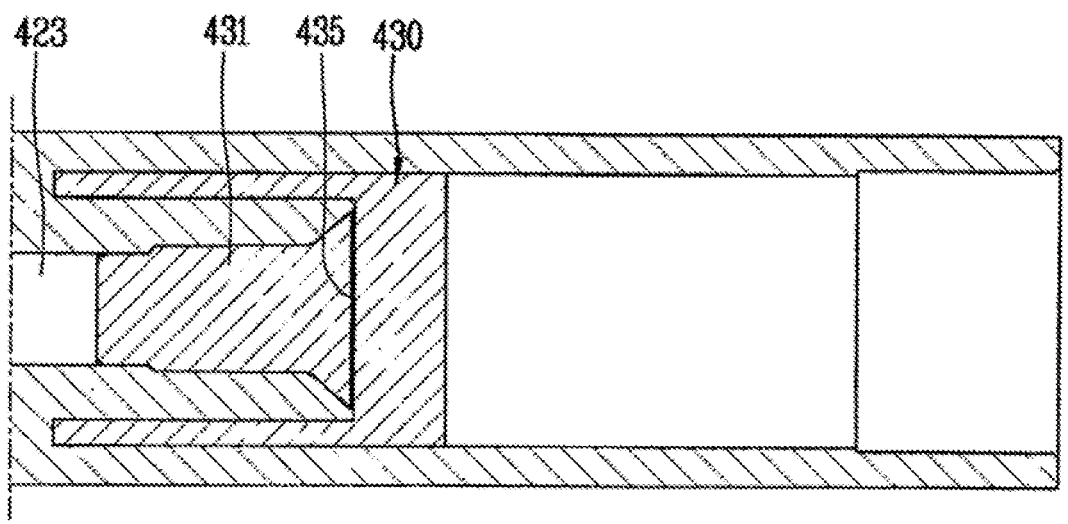
Figure 10D:
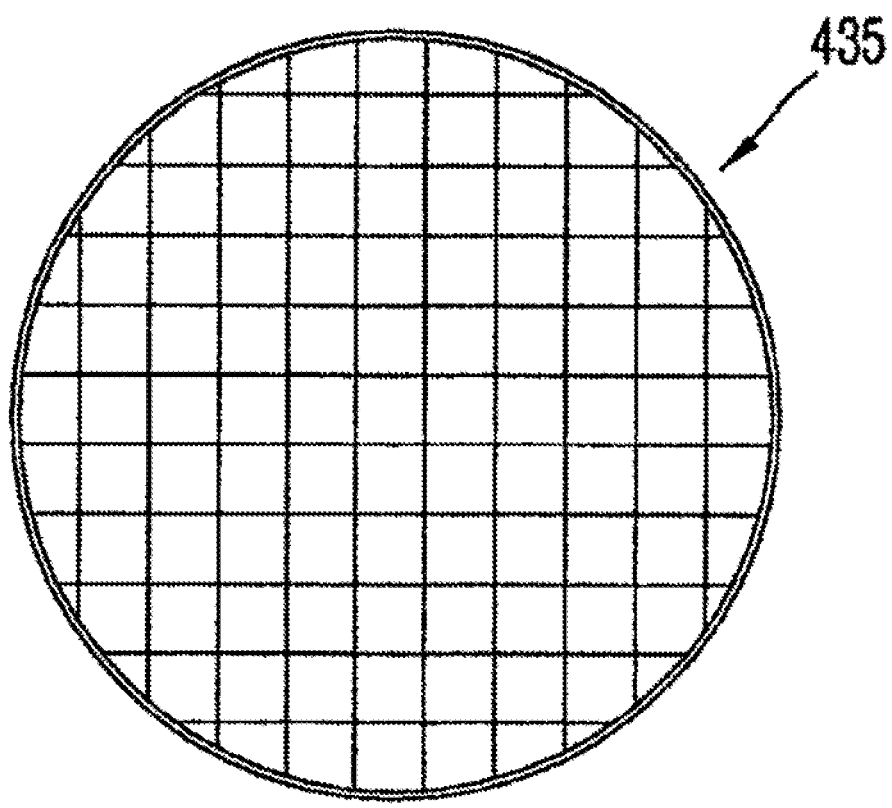
FIG. 10D is a frontal view of a mounting portion shown in FIGS. 10B and 10C.

FIG. 10A is a perspective view showing a sectional surface of a valve assembly 400 according to yet still another embodiment of the present invention, in a blocked state of a communication flow path 423. FIGS. 10B and 10C are enlarged views of a flow path blocking valve 430 of the valve assembly 400 shown in FIG. 10A, and are conceptual views which show a state before an overpressure occurs in the accommodation space 14 and a state after the overpressure is relieved, respectively. And FIG. 10D is a frontal view of a mounting portion 435 shown in FIGS. 10B and 10C.

Referring to FIGS. 10A to 10C, the injection container includes a housing 10, a mounting cup 15, a stem housing 420, a valve stem 410 and a flow path blocking valve 430. An opening/closing member 411, an air discharge hole 412, a mounting portion 421, a hollow portion 4211, a valve spring 422, a communication flow path 423 having a first communication flow path portion 4231 and a second communication flow path portion 4232, a protruding part 451, a locking shape portion 452, a notch groove 453, and a through hole 454, which are shown in FIGS. 10A to 10C, may be formed to have the same or similar features as or to the opening/closing member 111, the air discharge hole 112, the mounting portion 121, the hollow portion 1211, the valve spring 122, the communication flow path 123 having the first communication flow path portion 1231 and the second communication flow path portion 1232, the protruding part 151, the locking shape portion 152, the notch groove 153, and the through hole 154 which have been aforementioned with reference to FIGS. 1A to 7B.

The flow path blocking valve 430 includes a melting portion 431.

The melting portion 431 is arranged on a flow path connected to an inlet of the communication flow path 423 in a solid state, and is formed to melt from a solid state to a liquid state at a temperature more than a preset level.

When an inner temperature of the accommodation space 14 is increased to a level more than a preset temperature, as shown in FIG. 10, a moving path of the melting portion 431 which has melted is formed between the flow path blocking valve 430 and the communication flow path 423, such that the melting portion 431 in a solid state melts, moves, and is solidified to block at least a part of the communication flow path 432.

The stem housing 420 may be further provided with a mounting portion 435.

The mounting portion 435 is arranged on a part of the communication flow path 423, in order to hinder a flow of the melted melting portion 431 introduced into the communication flow path 423, for solidification of the melting portion 431. And the mounting portion 435 is formed to block a region of the communication flow path 423 where the melted melting portion 431 passes. For instance, as shown in FIG. 10D, the mounting portion 435 may be formed to have a net shape. Under the configuration, while the melting portion 431 which is introduced into the communication flow path in a liquid state after being melted passes through the mounting portion 435, a flow amount in the communication flow path 423 may be reduced. And finally, the overpressure state may be released, and the communication flow path 423 may be closed by solidification of the melting portion 431.

Although not shown, the mounting portion 435 formed on the communication flow path 423 may be provided in plurality in a spaced manner along the communication flow path 423.

Further, the communication flow path 423 along which the contents accommodated in the accommodation space 14 pass while the melted melting portion 431 is introduced into the communication flow path 423 may be formed to have its width narrowed along a moving path of the melted melting portion 431. Accordingly, without an additional structure such as the mounting portion 435, the amount of gas which flows along the flow path may be reduced as the melting portion 431 which flows in a liquid state when heat is applied thereto moves along a wall of the communication flow path 423. Furthermore, the melting portion 431 is solidified as the overpressure state is released, and the communication flow path 423 is finally closed by the melting portion 431.

The configurations and methods of the injection container and the valve assembly thereof according to the aforesaid embodiments may not be limitedly applied, but such embodiments may be configured by a selective combination of all or part of the embodiments so as to implement many variations.

What is claimed is:

1. An injection container, comprising:
   a housing having therein an accommodation space for accommodating contents, and having an upper sealing cap for sealing an upper part of the accommodation space;
   a mounting cup mounted to the upper sealing cap, and having a through hole at a middle part thereof;
   a stem housing including a mounting portion having a hollow portion therein and mounted to the mounting cup, and a communication flow path for communicating the hollow portion with the accommodating space;
   a valve stem having one side which passes through the through hole, having another side arranged at the hollow portion so as to be slidable, and having an orifice selectively communicated with the hollow portion by the sliding; and
   a flow path blocking valve configured to block the communication flow path when an overpressure occurs,
   wherein the flow path blocking valve includes:
   a body inserted into an inlet of the communication flow path, and communicated with the accommodation space;
   a closing member accommodated in the body; and
   a melting portion configured to support the closing member in a solid state, and formed to melt at a temperature more than a preset level to be introduced into the communication flow path as the supported state by the closing member is released,
   wherein the melting portion is provided with a locking portion formed to have a hook shape before the melting portion melts in a solid state, and configured to support one side of the closing member which is towards the communication flow path.

2. The injection container of claim 1, wherein the communication flow path is formed to have its width narrowed along a moving path of the melted melting portion, the communication flow path along which the contents pass while the melted melting portion is introduced into the communication flow path.

3. The injection container of claim 1, wherein the melting portion is made of thermoplastic resin such that the melting portion melts, moves, and is solidified to form a double blocking structure of the closing member and the melting portion.

4. The injection container of claim 1, wherein the closing member is formed such that at least a part thereof is fixed to the melting portion, so as to block the communication flow path by moving to the inlet of the communication flow path, in a case that an inner temperature of the accommodation space is increased to a level more than a preset temperature.

5. The injection container of claim 1, wherein the melting portion is disposed between the inlet of the communication flow path and the closing member, so as to prevent a movement of the closing member in a solid state before the melting.

6. The injection container of claim 1, wherein the flow path blocking valve is arranged in a gravitational direction, in a mounted state of the injection container to an external device, such that the closing member and the melting portion move in the gravitational direction as the supported state is released.

7. The injection container of claim 1, wherein the closing member and the inlet of the communication flow path are formed to have their surfaces contacting each other, the surfaces facing each other after the closing member moves to the inlet of the communication flow path to block the communication flow path.

8. The injection container of claim 1, wherein the closing member is formed to have a spherical shape.

9. The injection container of claim 1, wherein the closing member is formed of a material having a higher melting point than the melting portion.

10. An injection container, comprising:
a housing having therein an accommodation space for accommodating contents, and having an upper sealing cap for sealing an upper part of the accommodation space;
a mounting cup mounted to the upper sealing cap, and having a through hole at a middle part thereof;
a stem housing including a mounting portion having a hollow portion therein and mounted to the mounting cup, and a communication flow path for communicating the hollow portion with the accommodating space;
a valve stem having one side which passes through the through hole, having another side arranged at the hollow portion so as to be slidable, and having an orifice selectively communicated with the hollow portion by the sliding; and
a flow path blocking valve configured to block the communication flow path when an overpressure occurs,
wherein the flow path blocking valve includes a melting portion arranged on a flow path connected to an inlet of the communication flow path in a solid state, and formed to melt at a temperature more than a preset level,
wherein a moving path of the melting portion which has melted is formed between the flow path blocking valve and the communication flow path, such that the melting portion melts, moves, and is solidified to block at least a part of the communication flow path when an inner temperature of the accommodation space is increased to a level more than a preset temperature, and
wherein the stem housing is further provided with a mounting portion arranged on a part of the communication flow path, in order to hinder a flow of the melted melting portion introduced into the communication flow path, for solidification of the melting portion, the mounting portion formed to block a region of the communication flow path where the melted melting portion passes.

11. The injection container of claim 10, wherein the mounting portion is formed to have a net shape.

12. A valve assembly mounted to a mounting cup fixed to an upper end of a housing, the valve assembly comprising:
a stem housing including a mounting portion having a hollow portion therein and mounted to the mounting cup, and a communication flow path for communicating the hollow portion with the accommodating space;
a valve stem having one side which passes through a central part of the mounting cup, having another side arranged at the hollow portion so as to be slidable, and having an orifice selectively communicated with the hollow portion by the sliding; and
a flow path blocking valve configured to block an inlet of the communication flow path when an overpressure occurs,
wherein the flow path blocking valve includes a melting portion arranged on a flow path connected to the inlet of the communication flow path in a solid state, and formed to melt at a temperature more than a preset level,
wherein a moving path of the melting portion which has melted is formed between the flow path blocking valve and the communication flow path, such that the melting portion melts, moves, and is solidified to block at least a part of the communication flow path when an inner temperature of the accommodation space is increased to a level more than a preset temperature, and
wherein the stem housing is further provided with a mounting portion arranged on a part of the communication flow path, in order to hinder a flow of the melted melting portion introduced into the communication flow path, for solidification of the melting portion, the mounting portion formed to block a region of the communication flow path where the melted melting portion passes.

* * * * *